United States Patent
Kawase et al.

[11] Patent Number: 5,259,159
[45] Date of Patent: Nov. 9, 1993

[54] CONSTRUCTION HAVING A DAMPING DEVICE

[75] Inventors: Hiroshi Kawase; Ikuo Takahashi; Toshiaki Sato; Yasuhiro Hayashi; Toru Ishii; Sekio Nambu; Hiroshi Inada; Tetsushi Kiyokawa, all of Tokyo, Japan

[73] Assignee: Shimizu Construction Co., Ltd, Japan

[21] Appl. No.: 786,395

[22] Filed: Nov. 1, 1991

[30] Foreign Application Priority Data

Nov. 8, 1990 [JP] Japan ................... 2-303042
Nov. 8, 1990 [JP] Japan ................... 2-303043

[51] Int. Cl.⁵ ........................... E02D 27/37
[52] U.S. Cl. ........................... 52/167 R; 52/1
[58] Field of Search ......... 52/73 R, 167 CB, 167 DF, 52/167 R, 1

[56] References Cited

U.S. PATENT DOCUMENTS

| | | | |
|---|---|---|---|
| 1,559,261 | 10/1925 | Konsalik | 52/1 |
| 3,538,653 | 11/1970 | Meckler | 52/1 |
| 3,796,017 | 3/1974 | Meckler | 52/1 |
| 4,890,430 | 1/1990 | Kobori | 52/167 CB |
| 4,924,640 | 5/1990 | Suizu | 52/167 DF |
| 4,964,246 | 10/1990 | Kobori | 52/1 |
| 5,065,552 | 11/1991 | Kobori | 52/167 CB |
| 5,107,634 | 4/1992 | Onoda | 52/1 |

Primary Examiner—Carl D. Friedman
Assistant Examiner—Beth A. Aubrey
Attorney, Agent, or Firm—Biebel & French

[57] ABSTRACT

A construction having a damping device for damping vibration having steel wire cables 20 having both ends fixed on the sides of the building 10, the steel wire cables 20 are tautly and obliquely provided on the building 10 so that one side and the other side of the steel wire cables 20 cross at only one point in front view. Since the steel wire cables 20 do not exist in the horizontal direction, the length of the steel wire cables 20 is shorter as compared with the prior art. Accordingly, extension of the steel wire cables 20 decreases, the mechanism is simpler, and maintenance is also simplified.

36 Claims, 26 Drawing Sheets

FIG. 3
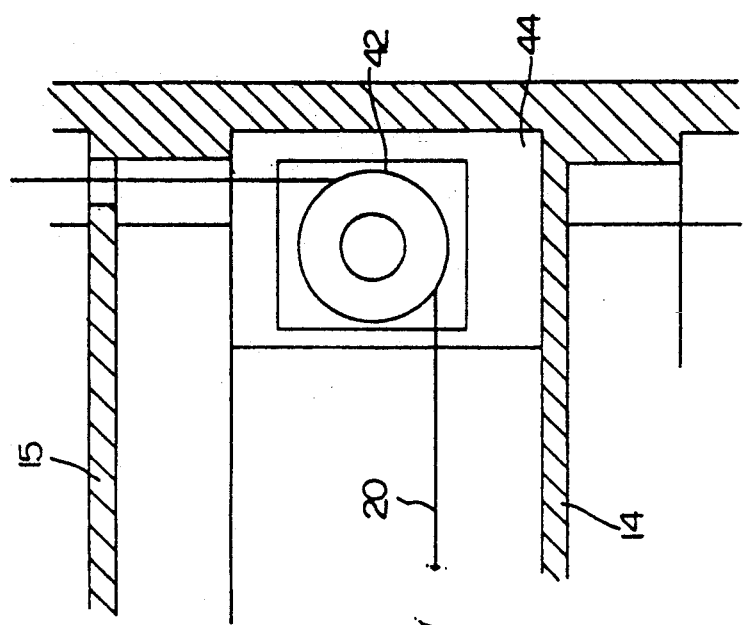
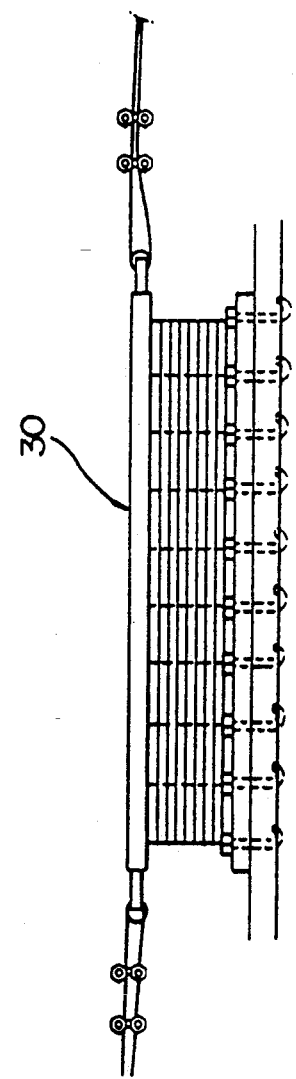

hysteresis characteristics of the lead plug hysteresis characteristics of the laminated rubber hysteresis characteristics of the laminated rubber having the lead plug

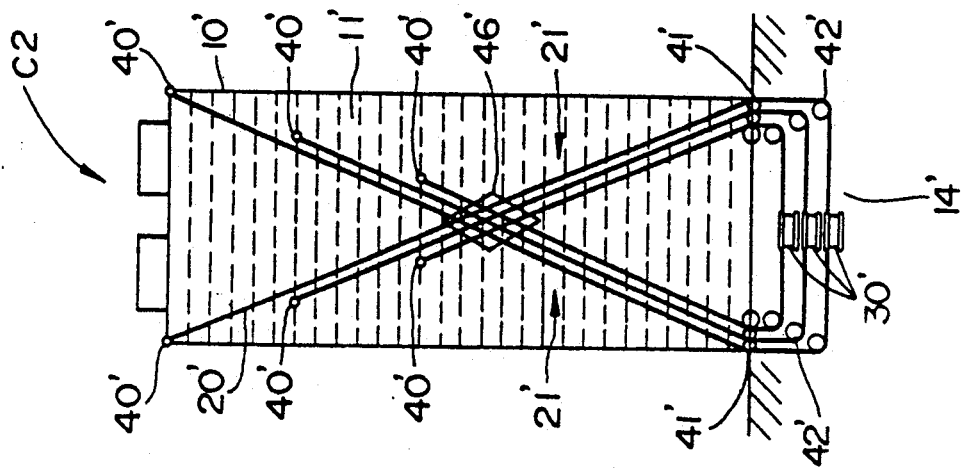
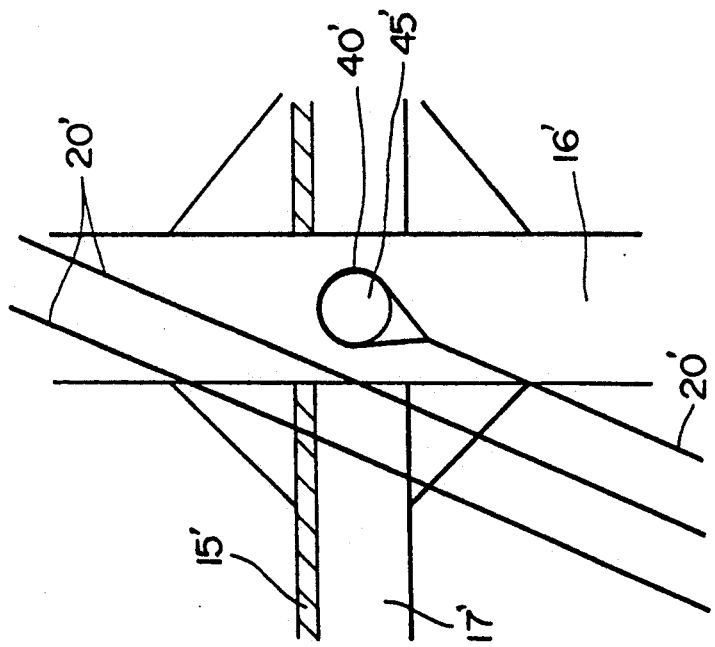

(a) mass No. 28 earthquake response wave form

LRB080

(a) maximum response acceleration

--- ORI 100
— DSP 100
━ LRB 100

(b) maximum response displacement (a) maximum response acceleration

- - - - ORI 100
——— DSP 100
——— LRB 080

(b) maximum response displacement

CONSTRUCTION HAVING A DAMPING DEVICE

BACKGROUND OF THE INVENTION

1. Field of the Invention

The present invention relates to a construction, having a damping device, which may be vibrated by, for example, earthquakes or wind. In particular, the present invention relates to a multistory construction having the damping device.

2. Prior Art

A construction having a damping device, such as high-rise building and multistory buildings are designed for safety and comfort in the event a horizontal force is imparted thereto by an earthquake or by wind.

Buildings in accordance with the prior art were designed so as to bear by rigid brace, earthquake resisting wall, and the like, horizontal forces (=displacement not too large, stress less than limit value). As a result, the maximum response depends on the damping ability of the building itself; the value of the maximum response is about 1~2% in a steel-reinforced concrete structure and about 5% in a reinforced concrete structure.

However, recently, a dynamic damping method called a "tuned mass damping method" or "tuned sloshing damping method" is used in high-rise buildings, towers, and the like, because the efficiencies of these constructions are not adequate.

In a dynamic damper, a spring mass damper type is added having a natural frequency similar to the natural frequency of the building. When the dynamic damper is provided in a building, vibration energy of the building is led to the addition type damper, and the apparent damping of the building is amplified in order that the addition type absorbs the vibration energy. However, this method has the following problems among others:

1. if the mass of the addition type damper is large, the efficiency is large; however, the mass of addition type damper is limited in practice;
2. space in the highest floor, which is most valuable, is occupied by the damper, and is therefore lost;
3. when an earthquake occurs, the amplitude of the addition type damper is too large to be absorbed or is absorbed inefficiently; and
4. only the primary natural frequency is efficiently absorbed.

Many damping methods are proposed, having strengthening materials which is provided at braces, earthquake resisting walls, and the like, as a method for amplifying the damping of vibrations in a construction more directly.

However, this method has the following problems, among others;

(a) the quantity of vibration energy absorbed per unit of construction in accordance with this method is small since the method depends on the relative displacement between stories. Accordingly, many units are necessary to ensure sufficient damping:
(b) the cost of construction in accordance with this method is high;
(c) the maintenance of a construction according to this method is complicated; and
(d) the weight of a construction in accordance with this method is large.

In order to provide a damping system to resolve the above problems, a method in which steel wire cables are tautly provided in constructions, steel wire cables are tautly provided on a building of the construction in a Z-configuration, as for example, as described in (JP-Heisei 2-1946).

This damping system is comprises, as shown in FIG. 29:

single steel wire cable 2, both sides of which are fixed at or near the top floor or nearly of the construction having the damping device 1, the middle portion of the steel wire cable 2 positioned at a lower floor;

pulley 3 provided at each junction between the beams and columns in each floor of the construction having the damping device;

an absorbing apparatus for absorbing displacement of the middle portion of the steel wire cable 2; and steel wire cable 2 provided around alternate pulleys 3, so as to zigzag across the face of the building the steel wire cable 2 cross itself.

However, this damping system has the following problems; among others:

(A) the cost of the damping apparatus is high and height of the damping apparatus is the large because of the steel wire cable 2 between pulley 3,3 is needed;
(B) the horizontal part of the steel wire cable 2 between pulleys 3,3 is streched in the ratio of the same as the slanded part of the steel wire cable 2 when they are pulled. Accordingly, the streching loss of the steel wire cable 2 is large because of strech of the horizontal part of the steel wire cable 2 is streced as above, the transferal quantity of horizontal displacement of the construction having the damping device is transmitted to the damping device which is fixed on the foundation porttion of the construction;
(C) the weight of the construction having the damping device is large and the cost of the construction having the damping device is high because of the many pulleys 3 are needed;
(D) frictional losses are large in the transfer of the energy to the damping apparatus because many pulleys 3 are;
(E) beams should be reinforced because each beam of each floor received axial force by the steel wire cables 3 which extends to horizontal direction;
(F) maintenance is difficult because of the complexity of the mechanism.

SUMMARY OF THE INVENTION

In consideration of the above problem, it is an object of the present invention to provide a construction having a damping device which can be provided at a lower the cost by, for example, providing shorter a tension members cables, obviate the need for reinforcement, and decrease maintenance requirements.

So as to satisfy these and other objects, the present invention provides a construction having a damping device for damping vibrations therein which comprises:

a building; and the damping device including at least one tension member wherein both ends of each thereof are fixed to opposite sides of the building, each tension member tautly and obliquely provided on the building so that one side and the other side of each tension member cross at only one point; and at least one damper for absorbing vibrational energy, the damper fixed on the building and connected at approximately the middle portion of each tension members at the base of the building.

Preferably, a construction having a damping device for damping vibrations which comprises:

a building having a central space; and the damping device including at least one tension member wherein both ends are fixed on the building in the central space, each tension member tautly and obliquely provided on the building so that one side and the other side of each tension member cross at only one point; and at least one damper for absorbing vibrational energy, fixed on the building and connected at approximately the middle portion of each tension member at the base of the building.

The tension member may also be a tension group comprising a plurality of tension members.

For example, steel wire cables, steel rods, aramid fiber cable, Kevler fiber cable and the like, can be used as the tension member.

Only one pulley, instead of the implementation portion pulley and the horizontal portion pulley, may be provided. Furthermore, it is possible to use a rotatable damper directly instead of the pulleys, and to use the implementation portion pulley and the horizontal portion pulley without the damper at the middle portion of the tension member.

The steel wire cable may be tautly provided between the node and antinode of the vibration mode of the building.

In a construction having the damping device in accordance with the present invention as described above, the following advantages result.

Since the tension member dose not exist in the horizontal direction, the length of the tension member in accordance with the present invention is shorter than in a construction having the damping device in accordance with prior art (the length of the steel wire cable is shorter as compared with a steel wire cable of the construction having the damping device in accordance with prior art, as an angle between the horizontal line and the steel wire cable is 45 degrees). Accordingly, extension of the steel wire cable is decreased, the mechanism is simpler, and maintenance is also simpler.

In addition, since the tension member is obliquely and tautly provided, axial compression force on the beams is less than when a tension member exists in the horizontal direction as in the prior art.

Furthermore, since each one side and each other side of each tension member cross at only one point when viewed from the front, there are fewer pulleys than in the construction having the damping device in accordance with the prior art. Therefore, it is possible to decrease friction of the pulleys, and thereby to decrease the loss of tensile force in the tension member to the damper.

Other objects and features of this invention will become clear from the following description with reference to the accompanying drawings.

BRIEF DESCRIPTION OF THE DRAWINGS

FIG. 3 is a partially side view of the horizontal portion pulley which is provided in the wall through the installation

FIG. 10 is a side view of the vibrational energy absorbing apparatus in the damping device of the construction in accordance with the second embodiment.

FIG. 11 is a side view of the connection between the column and the beam of the vibrational energy absorbing apparatus in the damping device of the construction.

DETAILED DESCRIPTION OF THE PREFERRED EMBODIMENTS

With reference to the Figures, preferred embodiments of the present invention will be described in detail in the following. In the following description, materials, structures, and the interrelationships of the structural elements are merely descriptive examples, and are not intended to limit the scope of the invention.

First, a construction having the damping device (C1) in accordance with the first embodiment of the present invention will be explained with reference to FIGS. 1 to 5.

Figure 1:
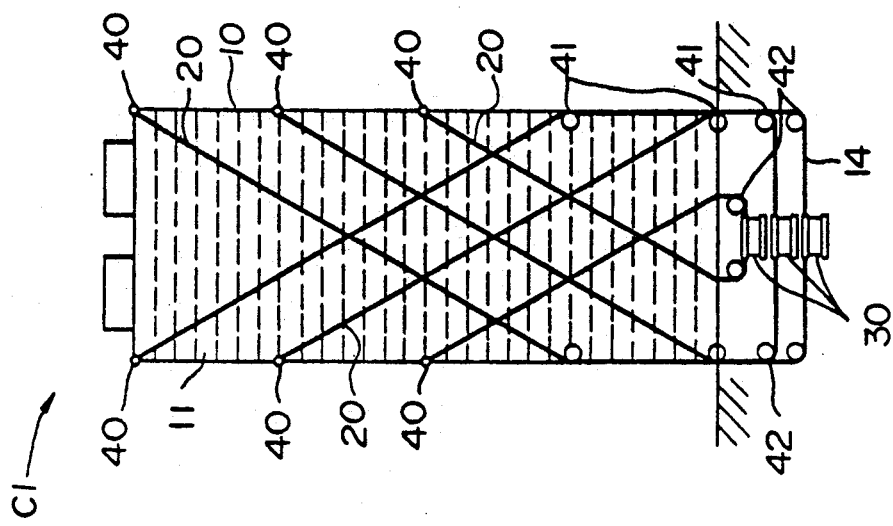
FIG. 1 is a side view of the construction having the damping device in accordance with the first embodiment.

The construction having the damping device (C1) in the first embodiment is a multistory building having 32 floors, as shown in FIG. 1, comprising:

a building 10 on the ground;

3 cables 20 fixed to an outer wall of the building 10;

three laminated rubber damping apparatuses 30 having lead plugs for absorbing tensile force from each cable 20, each provided in an underground floor of building 10 where each middle portion of each steel wire cable 20 is disposed.

Each cable 20 is obliquely and tautly provided on the building 10 so that each one side and each the other side of each steel wire cable 20, through laminated rubber damper 30, cross at only one point in a front view. Both ends of each steel wire cable 20 are fixed at the left side and the right side, respectively, on the top of the building (the position at which the ends of the steel wire cable 20 are fixed is hereafter referred to as the "fixing portions 40"); the one side of the cable 20 is directly and obliquely provided from the fixing portions 40 to an implementation portion pulley 41 which is opposite the fixing point 40; furthermore, the steel wire cable 20 is hung at a horizontal portion pulley 42 which is fixed at the underground floor implementation portion pulley 41 so as to be horizontal therein. The other side of the steel wire cable 20 is, in a manner similar to the one side of the steel wire cable 20, directly and obliquely provided from the other fixing portions 40 to the other implementation portion pulley 41 which is at the opposite side of the other fixing point 40; furthermore, the steel wire cable 20 is hung at the other horizontal portion pulley 42 at the underground floor implementation portion pulley 41 so as to be horizontal therein. Each cable 20 is thus tensioned from the left and the right of the cable 20 whose middle portion is connected at the laminated rubber damper 30, and add tensile force, so as to be string. The fixing portions 40 are provided at the 16th floor, the 24th floor, and the top floor, and the steel wire cables 20 are tautly provided, so as to be able to produce damping effects not only at the first mode of vibration, but also at higher modes. Accordingly, in the first embodiment, as shown in FIG. 1, the implementation portion pulleys 41 are provided at both sides of the 8th floor, both sides of the basic portion 14, and at the middle portion of the basic portion 14, because if the angle between each steel wire cable 20 lines and the horizontal line is large, transmission of force is not adequate.

Figure 2:
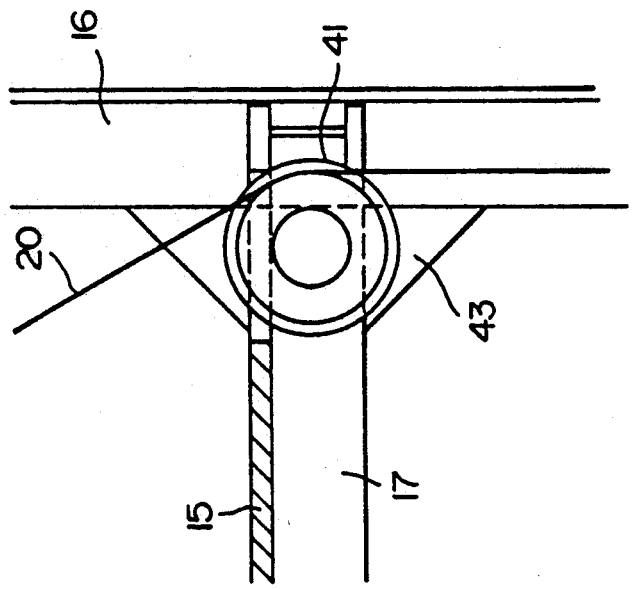
FIG. 2 is a partial side view of the implementation portion pulley which is provided at the beam.

Each implementation portion pulley 41 is, as shown in FIG. 2, rotatable in the vertical plane attached at connections of column 16 and beam 17 so that the axis of each implementation portion pulley 41 is perpendicular to the outer wall 11. Furthermore, each connection of the column 16 and the beam 17 is reinforced by reinforcing plate 43.

Each horizontal portion pulley 42 is, as shown in FIG. 3, rotatably attached at each installation plate 44. The installation plate 44 is fixed on the wall, which is anchored in the reinforced thick wall. Each horizontal portion pulley 42 changes the direction of each steel wire cable 20 from vertical to horizontal, and leads the steel wire cable to the laminated rubber damper 30.

Figure 4:
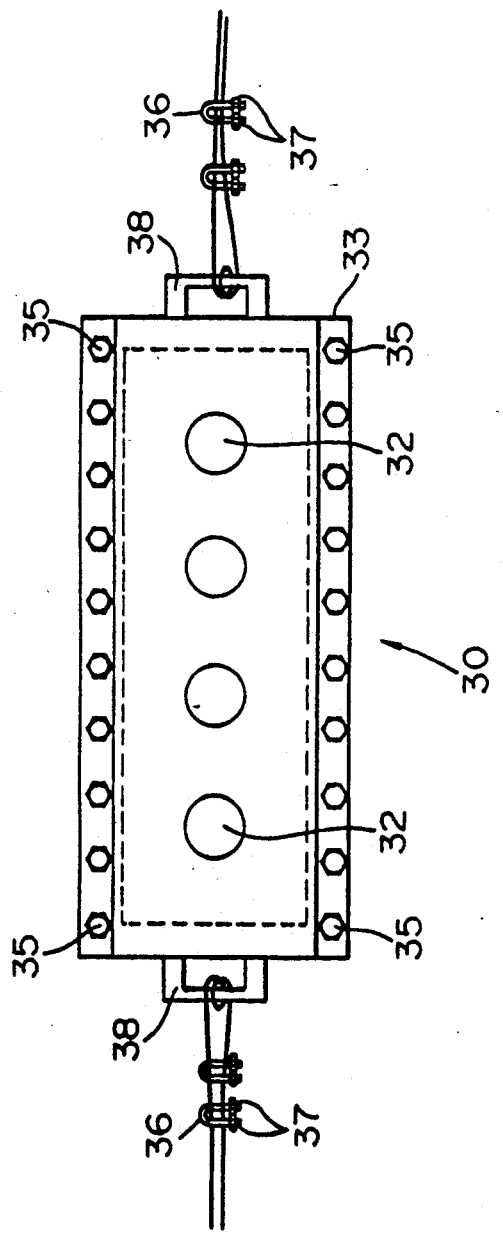
FIG. 4 is a plane view of the laminated rubber.
Figure 5:
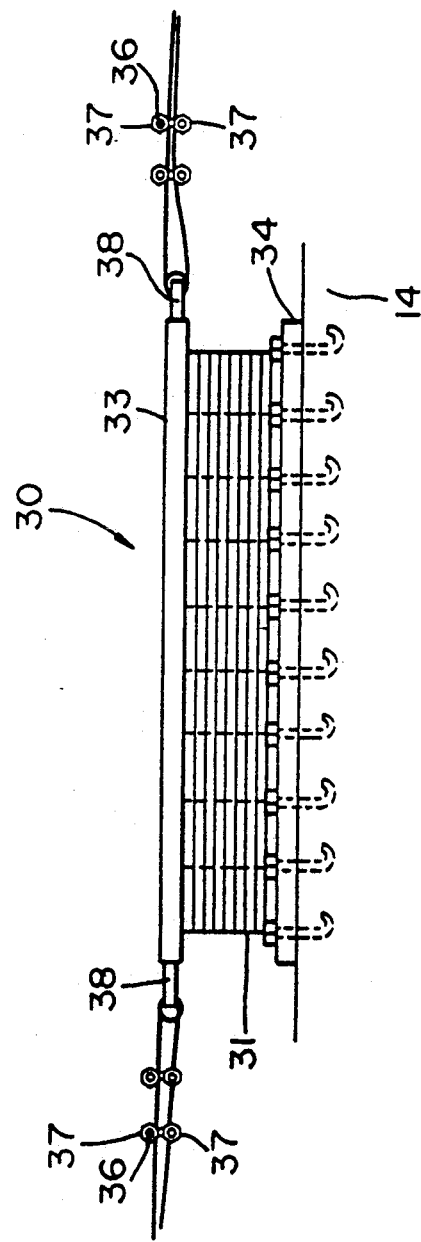
FIG. 5 is a side view of the laminated rubber.

Each laminated rubber damper 30 is comprising, as shown in FIGS. 4 and 5, rubber rectangularsheets rectangularsheets having four equally spaced holes of at the middle portion perpendicular to the longitudinal direction in plane view;

rectangular steel plates having of four holes at positions corresponding to the four equally spaced holes in the laminated rubber in plane view because not receives vertical road;

cylindrical lead plugs 32;

top plate 33 at the top of each laminated rubber damper 30;

base plate 34 at the bottom of each laminated rubber damper 30;

laminated rubber 31 sheet formed in order that the rubber and the steel plate may be laminated together, cured, and bonded, the laminated rubber damper 30 formed so as to accommodate lead plugs in the holes in the laminated rubber 31, so that deformation of the laminated rubber 31 results in deformation of the lead plugs 32;

the laminated rubber damper 30 formed in order that each laminated rubber 31 and four lead plugs 32 are fixed and bound between the top plate 33 and base plate 34;

each laminated rubber 31 fixed on slab 15 of the basic portion 14 through the base plate 34 which is fixed on the slab 15 by installation bolts 35.

The steel wire cable 20 is connected to both ends of the top plate 33 through the installations 38 which are formed in approximately a C-shape in plan view so that horizontal movement (mainly in the longitudinal direction of the laminated rubber damper 30) of the building 10 due to earthquakes, wind, and the like, is transferred to the top plate 33. The steel wire cable 20 is connected to the installation 38 by fastening bolts 36 and bolts 37.

Next, the function of the construction having the damping device (C1) is explained.

The cable 20 transfers tensile force which occurs by vibration of the building 10 by earthquake and the like to each laminated rubber damper 30.

Figure 6:
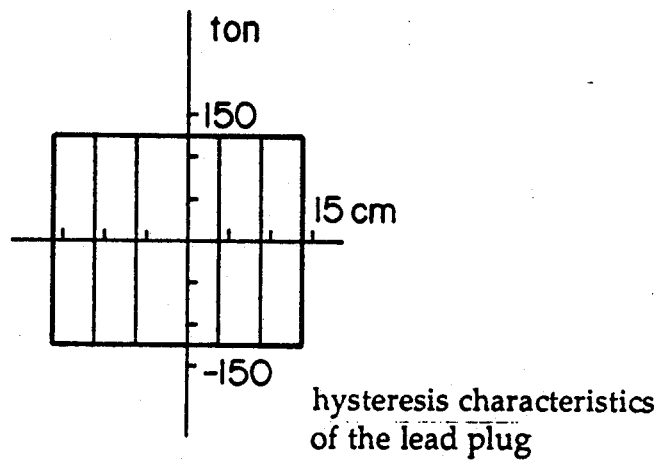
FIG. 6 is a graph of hysteresis characteristics of the lead plug.
Figure 7:
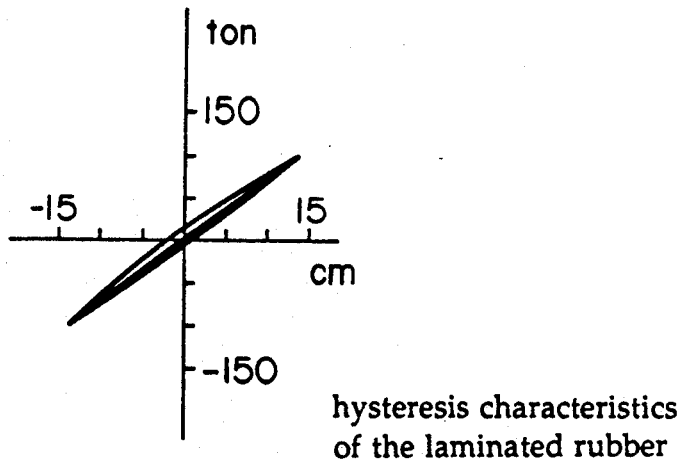
FIG. 7 is a graph of hysteresis characteristics of the laminated rubber.
Figure 8:
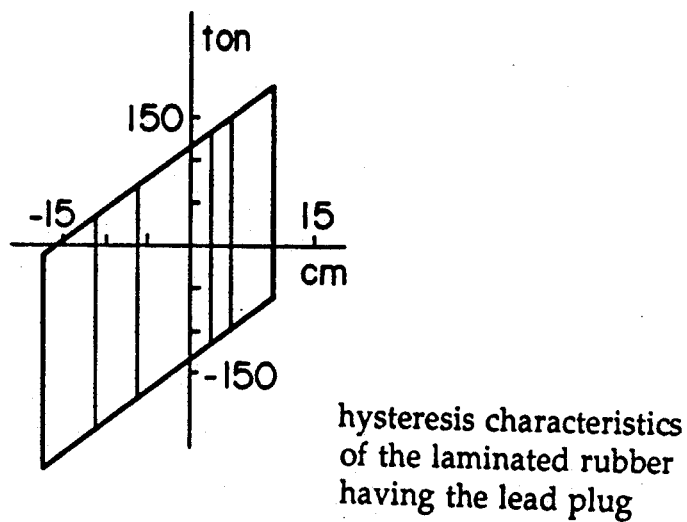
FIG. 8 is a graph of hysteresis characteristics of the laminated rubber having a lead plug.

Each laminated rubber damper 30 absorbs the vibration energy as the laminated rubber 31 and the lead plug 32 shear and deform when the cable 20 pulls the top plate 33 to the left or right (in the FIGS. 1, 3, 4, and 5). The lead plugs 32 have, as shown in FIG. 7, a hysteresis loop of the perfectly elastic form, the lead plug 32 absorbs tiny deformation. For instance, the laminated rubber damper 30 of a length of 180 cm, a width of 60 cm, and a height of 27 cm (9 layers) has a damping effect of 150 t. FIG. 6 is a graph of the hysteresis characteristics of the lead plugs. FIG. 6, and FIG. 8 are graphs of the hysteresis characteristics of the laminated rubber having a lead plug. The laminated rubber damper 30 thus restrains movement of the cable 20, and damps building vibration of the 10 so as to compensate for the tensile force of the steel wire cable 20.

Next, operation of the construction having the damping device (C1) is explained with reference to FIG. 9. For the sake of simplicity, the building 10 is schematically represented, and the number of lead plugs 30 is one, the number of steel wire cables 20 is one.

Figure 9:
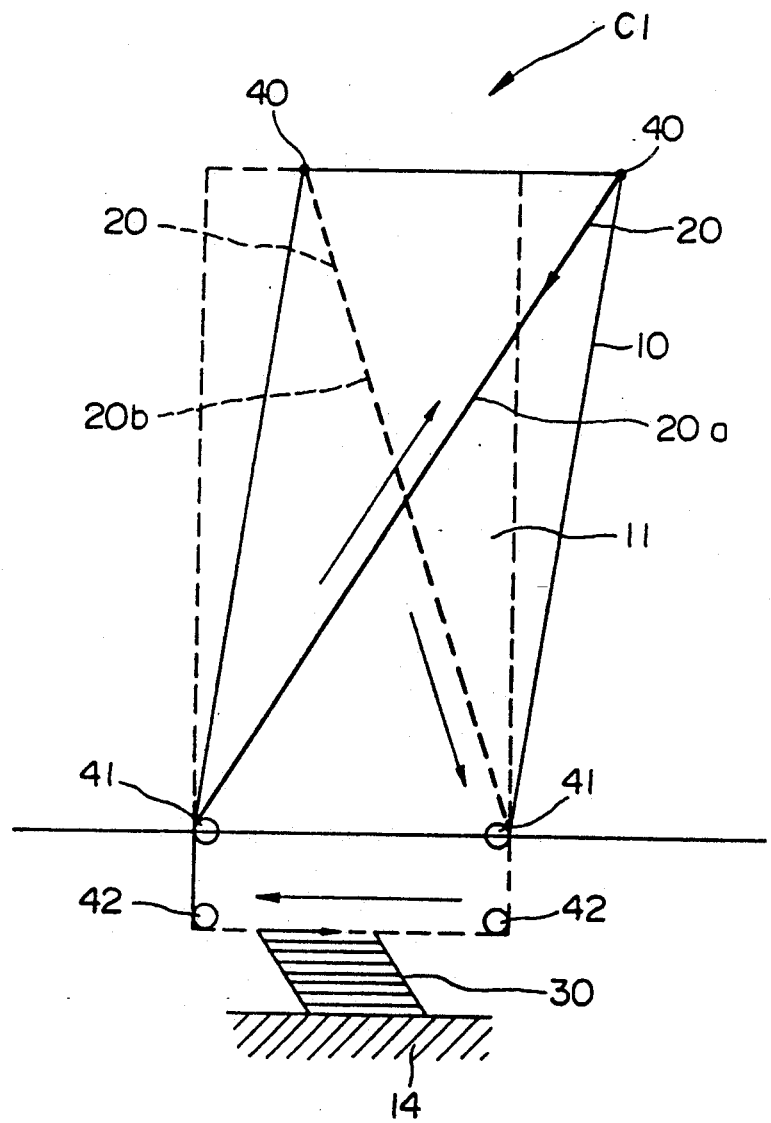
FIG. 9 is a side view of the equivalence of the construction having the damping device, which indicates operating condition.

The construction having the damping device (C1) vibrates when receiving earthquake force and wind force; then, the construction having the damping device (C1) deforms from the resting position (position denoted by the doted line in FIG. 9) to the position denoted by the solid line in FIG. 9. As a result of this, the relative distance between the upper right side and the lower left side of the construction having the damping device (C1) increases, the steel wire cable 20 from the upper right fixing portion 40 to the lower left direction is pulled, and the relative displacement is transferred to the laminated rubber damper 30 through the cable (20a) of the pulling side. The laminated rubber damper 30 generates damping force in proportion to input displacement or input velocity, and equilibrates the tensile force of the steel wire cable 20. The force to restrict vibration occurs in the direction of restricted deformation of the laminated rubber damper 30 by the steel wire cable 20 and the laminated rubber damper 30, which operates in the construction having the damping device (C1).

On one hand, the other side of the cable 20, that is, the cable (20b) of the unpulling side is pulled by the cable (20a) of the pulling side because the relative distance between the upper right side and the lower left side of the construction having the damping device (C1) decreases.

In the next moment, if the construction having the damping device (C1) deforms to the left, the construction having the damping device (C1) operates in a converse manner to the above operation.

Next, advantages of the construction having the damping device (C1) are explained.

1. The steel wire cable 20 of the construction having the damping device (C1) is shorter in comparison with the cable of a construction having the damping device in accordance with the prior art. Accordingly, extension of the steel wire cable 20 is decreased.

2. Furthermore, since the steel wire cable 20 is obliquely and tautly provided (the steel wire cable 20 does not run in the horizontal direction), axial compression force of the beams decrease as compared with when the steel wire cable runs in the horizontal direction in accordance with the prior art.

3. Furthermore, since each one side and each the other side of each cable 20 cross at only one point in a front view, the number of pulleys is less than in a construction having the damping device in accordance with the prior art. Thereby, it is possible to decrease friction of the pulleys, and therefore to decrease the loss of tensile force in the steel wire cable 20 to the laminated plug 30.

4. Furthermore, as in the above first embodiment, it is possible that each steel wire cable 20 receives relative displacement between the base portion 14 and the fixing portion 40 at the top floor, 24th floor, and 16th floor. Thereby, force input to the laminated rubber damper 30 increases, and the laminated rubber damper 30 can efficiently absorb vibration energy.

5. Furthermore, as above, since the steel wire cable 20 is tautly provided so as to cross at only one point, the steel wire cable 20 (unstressed side of the steel wire cable 20) is not loose. Accordingly, by using hysteresis, the undamping region which occurs at the stctic position of the building 10 changes when residual deformation occurs; the undamping region does not enlarge.

6. Since the fixing portions 40 are tautly provided at not only the top floor, but also at the 16th floor and at the 24th floor, not only are primary vibrations damped, but multiple vibrations are also damped.

7. Since the steel wire cables 20 are tautly provided from right and left sides of the 16th floor, 24th floor and top floor, the construction having the damping device (C1) can damp vibration equally well in the right and left directions (right and left of the FIG. 1)

Figure 17:
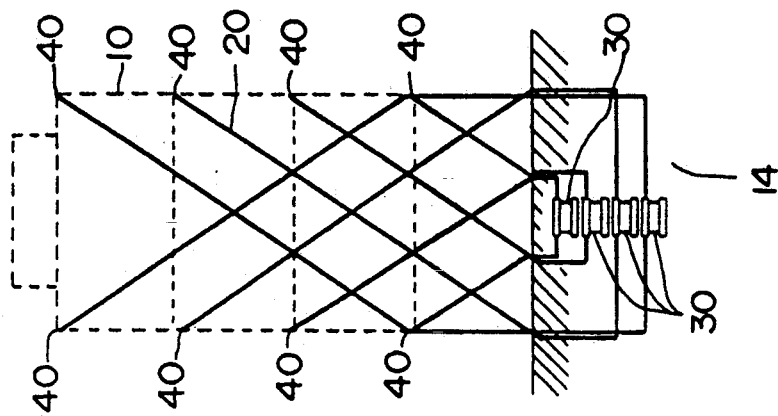
FIG. 17 is a side view of the vibrational energy absorbing constructions in accordance with simulation model of the construction.

As shown in FIG. 17, the steel wire cable 20 is tautly provided between the 8th floor and base portion 14 without crossing each other.

A construction having the damping device in accordance with the second embodiment is explained with reference to FIGS. 10 to 13.

The constructions having the damping device (C2) in accordance with the second embodiment is, as shown in FIG. 10, a multistory construction having 28 floors, comprising:

a building 10' on the ground;

each both ends of a steel wire cable group 21' comprising three steel wire cables 20' (tension member) are fixed at an outer wall of the building 10'; and three laminated rubber dampers (damping apparatus) 30' having lead plugs for absorbing tensile force in each steel wire cables 20' which is each provided at the underground floor of building 10' where each middle portion of each steel wire cable 20' is positioned.

Each steel wire cable 20' of the steel wire cable group 21' is obliquely and tautly provided on the building 10' so that each one side and each the other side of each steel wire cable 20', through laminated rubber damper 30', cross at only one point in front view. Furthermore, each both ends of each steel wire cable 20' is connected at each fixing portion 40' which is provided at the top floor, the 22th floor, and the 16th floor;

each steel wire cable 20' is hung on the implementation portion pulleys 41' which are rotatably provided at the first floor of the base portion 14' so that the provided direction of each steel wire cable 20' is transferred to the vertical direction, and each steel wire cable 20' is led inside of the basic portion 14' (under ground);

furthermore, each steel wire cable 20' is hung on each horizontal portion pulley 42' so that the provided direction of each steel wire cable 20' is transferred from the vertical direction to the horizontal direction;

the laminated rubber damper 30' intervenes at the middle portion of each steel wire cable 20';

and tensile force is provided to each steel wire cable 20'.

Accordingly, the steel wire cable group 21' is obliquely and tautly provided on the building 10'.

Each fixing portion 40' has, as shown in FIG. 11, a fixing pin 45' which is fixed at a column 16' where is nearly connection between the column 16' and a beam 17'; both ends of the steel wire cable 20' are fixed at each fixing pin 45'. The fixed portions 40' are provided at both sides of the building 10'. The other fixed portions 40', that is, fixed portions 40' are provided on the 22nd floor and the 16th floor so that the angle of the horizontal line and the steel wire cables 20' which should be tautly provided is the same as angle of the horizontal line and the steel wire cables 20' having both ends fixed at the top floor.

Figure 12:
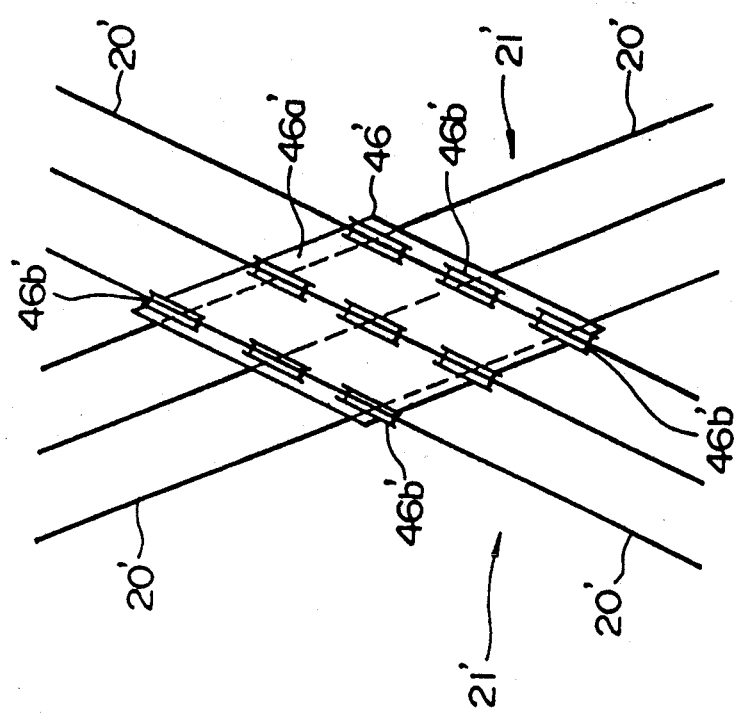
FIG. 12 is a plane view of the contact prevention apparatus of the vibrational energy absorbed apparatus in the damping device of the construction.
Figure 13:
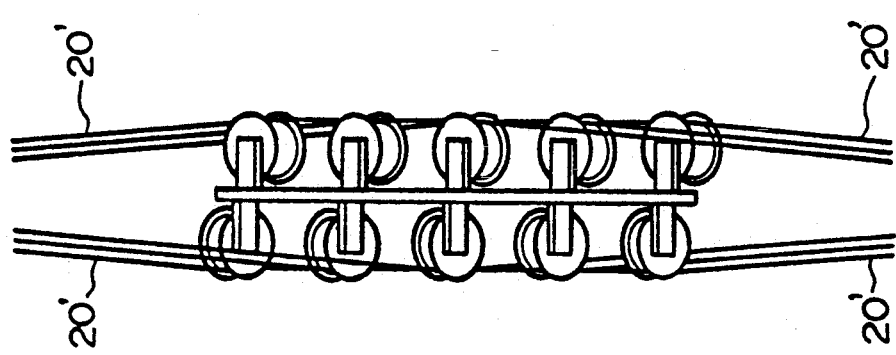
FIG. 13 is a side view of the contact prevention apparatus of the vibrational energy absorbed apparatus in the damping device of the construction.

Furthermore, in this second embodiment, each contact prevention apparatus 46' which is provided at each intersection of the steel wire cable group 21' ensures that there is no contact between steel wire cable groups 21'. Each contact prevention apparatus 46' is as shown in FIGS. 12 and 13, comprising:

a steel plate (46a') which is diamond-shaped in front view; and plural pulleys for hanging the steel wire cable (46b') which are provided on both faces of the steel plate.

The method of providing the implementation portion pulleys 41', horizontal portion pulleys 42', and laminated rubber damper 30', are the same as in the first embodiment.

Since the constructions having the damping device (C2) may be constructed as above, it is possible to obtain operational advantages as well as other advantages.

Furthermore, each contact prevention apparatus 46 is provided at each intersection of the steel wire cable groups 21' to prevent abrasion of the steel wire cables 20'.

A construction having the damping device in accordance with the third embodiment is explained with reference to FIGS. 14 to 16 hereinafter.

Figure 14:
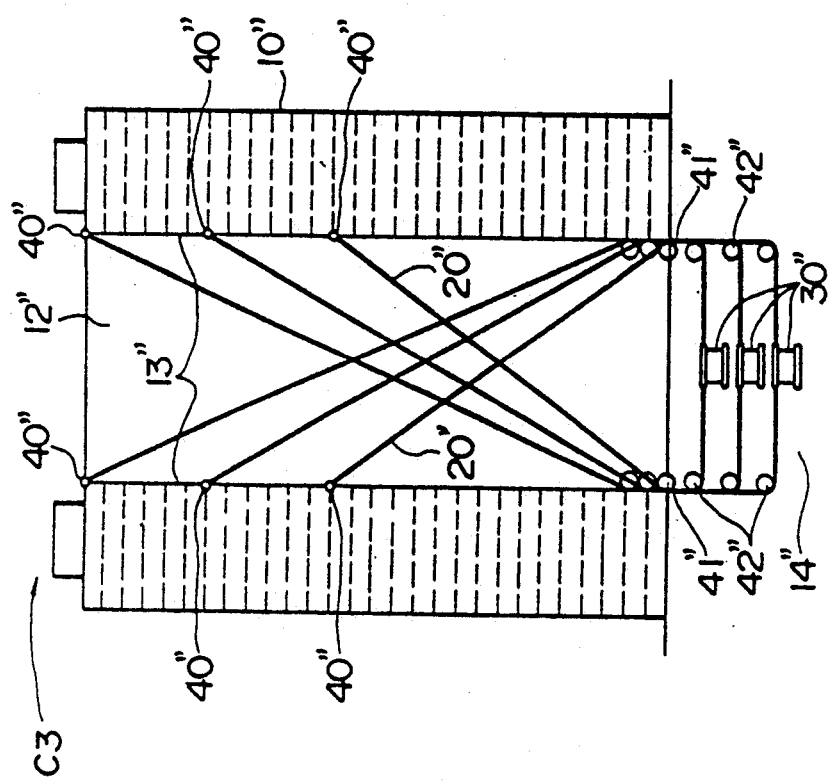
FIG. 14 is a side view of the vibrational energy absorbing apparatus in the damping device of the construction in accordance with the third embodiment.

A construction having the damping device (C3) in accordance with the second embodiment is, as shown in FIG. 14, a multistory construction of 22 floors, which is square in plane view, having a central space 12" as an atrium, inner court, and the like. The construction having the damping device (C3) comprising:

a building 10" on the ground;

three steel wire cables 20" fixed at the outer wall of the building 10"; and three laminated rubber dampers (damping apparatus) 30" having lead plugs for absorbing tensile force in each steel wire cable 20" each provided at the underground floor inside the building 10" where each middle portion of each steel wire cable 20" is positioned.

Each steel wire cable 20" is obliquely and tautly provided on the building 10" so that the laminated rubber dampers 30" can receive tensile force in each steel wire cable 20".

Each steel wire cable 20" is obliquely and tautly provided on the building 10" so that each one side and each the other side of each steel wire cable 20", through laminated rubber damper 30", cross in only one point in a front view. Furthermore, each end of each steel wire cable 20" is connected at each fixing portion 40" which is provided at the inner wall 13" of the top floor, the 22nd floor, and the 16th floor;

each steel wire cable 20" is hung on implementation portion pulleys 41" which are rotatably provided at the first floor of the basic portion 14" so that the provided direction of each steel wire cable 20" is transferred to the vertical direction, and each steel wire cable 20" is led inside the basic portion 14" (under ground);

furthermore, each steel wire cable 20" is hung on each horizontal portion pulley 42" so that the providing direction of each steel wire cable 20" is transferred from the vertical direction to the horizontal direction;

laminated rubber damper 30" intervening at middle portion of each steel wire cable 20"; and tensile force is provided to each steel wire cable 20".

Figure 15:
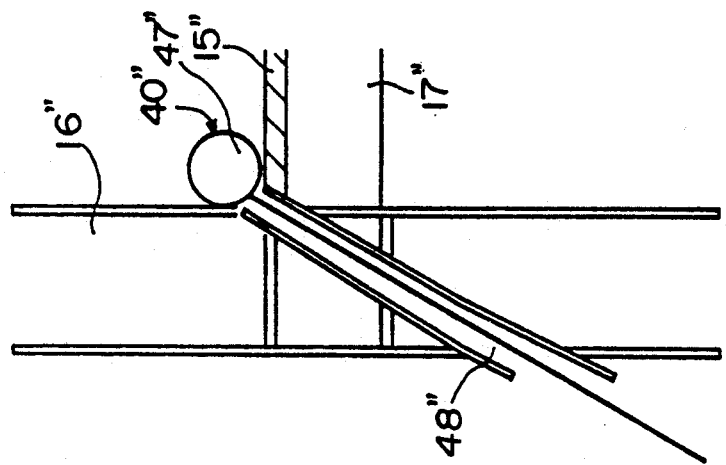
FIG. 15 is a side view of the fixing portion which is provided at the connection between the column and the beam.

Each fixing portion 40" has, as shown in FIG. 15, passing holes 48" for passing the steel wire cable 20" through, each of which is provided at the connection between the column 16" and a beam 17";

fixing sphere 47" for fixing each end of the steel wire cable 20", each of which does not pass through the holes 48".

Figure 16:
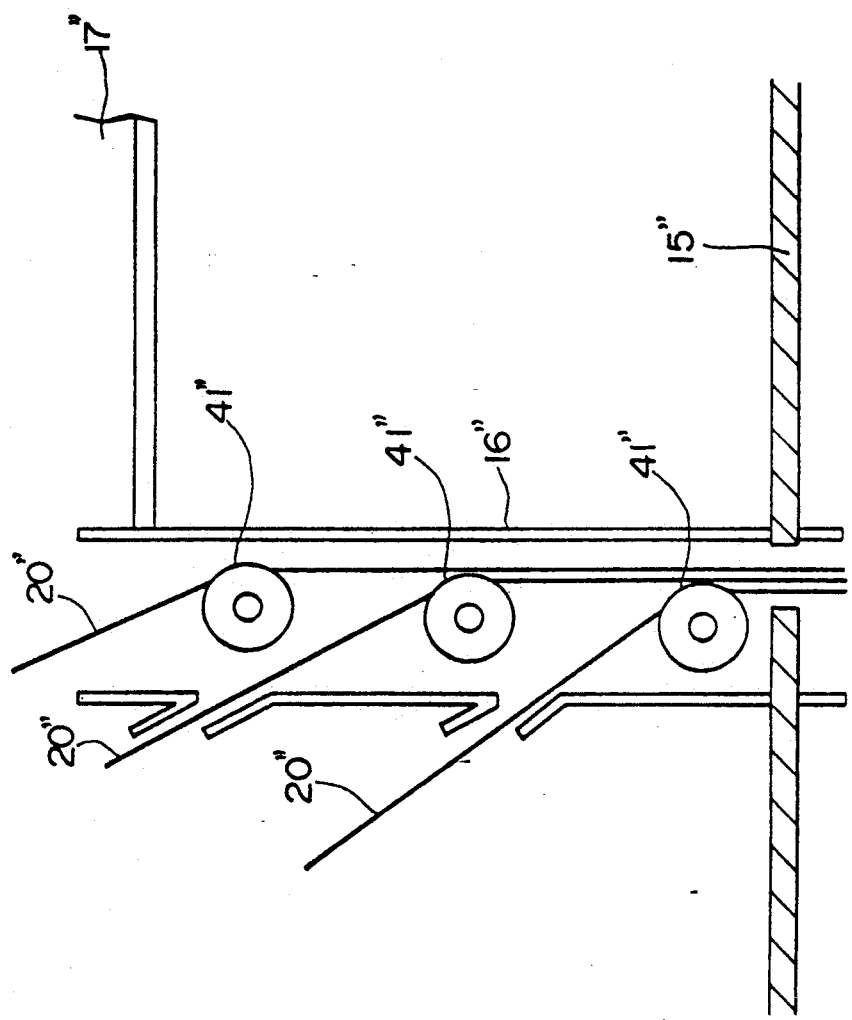
FIG. 16 is a side view of the implementation pulley which is provided on the column.

Each implementation portion pulley 41" is, as shown in FIG. 16, of provided the column 16" along the vertical line of the column 16" so as to hang each steel wire cable 20" which is fixed at the portion 40".

The method of providing the horizontal portion pulleys 42" and laminated rubber damper 30", are the same as in the first embodiment.

Since the constructions having the damping device (C2) is constructed as above, it is possible to obtain operational advantages as well as other advantages.

Furthermore, in the third embodiment, since the construction having the damping device (C3) has the central space 12", the steel wire cables 20" are able to be tautly provided; for instance, each steel wire cable 20" from the upper right to the lower left is provided at odd columns 16", and each steel wire cable 20" from alternatively the upper left to the lower right is provided at even columns 16";

alternatively, the steel wire cables 20" are provided diagonally in plane view.

In addition, in the third embodiment, the steel wire cables 20" are fixed at the same column 16"; however, it is possible that the steel wire cables 20" are fixed at different columns 16". In this case, each implementation pulley 41" is rotatably provided at these different columns 16".

Examples of the Vibration Energy Absorbing Apparatus

Next, with reference to the Figures, other examples of preferred vibration energy absorbing apparatuses, adopted in the damping device as above, will be explained.

The first example is shown in FIGS. 30 to 33. A vibration energy absorbing apparatus (A1) in accordance with the first example is constructed in order that a pair of circular plates (an upper circular plate 110 and a lower circular plate 111) is rotatably combined together between each axis of the center of the upper circular plate 110 and the lower circular plate 111. The eight lead plugs, as the damping material 112, are regularly spaced between the upper circular plate 110 and the lower circular plate 111.

In the vibration energy absorbing apparatus (A1) as above, the lower circular plate 111 is fixed on the construction having the damping device, and the steel wire cable 20 is wrapped around an axis body 113 of the upper circular plate 110 in a non-slipping manner. In the vibration energy absorbing apparatus (A1) as above, when the steel wire cable 20 tends to one side of the displacement of the construction having the damping device, the upper circular plate 110 rotates relative to the lower circular plate 111. Therefore, as shown FIG. 32, shear deformation occurs in each lead plug 112, and the vibration energy is absorbed by the lead plugs 113. Then, in the vibration energy absorbing apparatus (A1), the damping force (Fd) of the vibration energy absorbing apparatus (A1) is amplified and the damping force is transferred to the construction having the damping device in order that the steel wire cable 20 be wrapped around an axis body 113 of the upper circular plate 110 in a non-slip manner. The result is that it is possible to reduce the quantity of the lead plugs 113 as the damping material.

Figure 33:
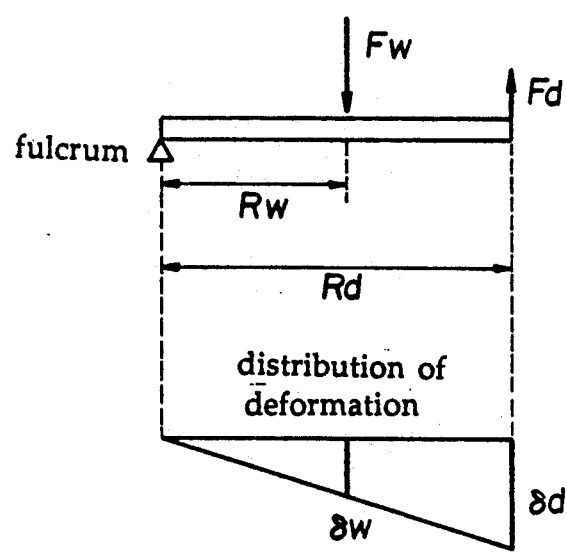
FIG. 33 is a concept view for explaining the operation of the vibrational energy absorbing apparatus in the damping device of the construction.

This above matter is explained with reference to FIG. 33. In the vibration energy absorbing apparatus (A1) as above, during operation, the axis of the center of the upper circular plate 110 and the lower circular plate 111 acts as a fulcrum of a lever, and the centers of the attaching points of the lead plugs 112 becomes a pushing point which is given the force (Fd); a point of application to which the force (Fd) is transferred is a wiring point of the steel wire cable 20. Accordingly, the distance (Rd) between the fulcrum and the pushing point and the distance (Rd) between the fulcrum and the point of application have the following static relationship:

$$Fw/Fd = Rd/Rw$$

$$Fw = Fd(Rd/Rw) = aFd$$

($a = Rd/Rw$).

That is, the force (Fw) which is transmitted from the vibration energy absorbing apparatus (A1) to the constructions having the damping device through the steel wire cable 20 is a force which is amplified to Rd/Rw times the real damping force of the vibration energy absorbing apparatus (A1). For instance, when Rd/Rw = 2, then the damping force is amplified 2 times. In this case, by the principle of the lever, the displacement of the pushing point $\delta d$ is equal to Rd/Rw times the displacement of the point of application $\delta w$.

That is, the following relationship exists:

$$\delta d/\delta w = Rd/Rw = a.$$

Accordingly, the vibration energy absorbing apparatus (A1) apparent damping coefficient (Ce) is, as shown in the following equation, is Rd/Rw times the actual damping coefficient (C).

$$Ce = Fw/\delta w = a^2 C.$$

The capacity of the apparatus in absorbing energy is in proportion to the quantity of the damping material used, that is, the quantity of the lead plugs 112. The quantity of the lead plugs 112 is inversely proportional to $a^2$ in the vibration energy absorbing apparatus (A1) as above. Therefore, it is possible for the cost of the vibration energy absorbing apparatus (A1) to be lowered.

It is obvious from the above explanation that the amplification of the damping force is theoretically so large (the length of Rd may be very large and the length of the Rw may be very small) as to be an important consideration. However, if the length of Rd is very large, vibration energy absorbing apparatus (A1) is too large. Accordingly, the installation space must be considered. If the length of Rw is too small, the prevention of slipping of the steel wire cable 20 relative to the axis body 113 is difficult. In this case, for instance, a sprocket is provided on the axis body 113 and a chain is extended over the middle of the steel wire cable 20; the steel wire cable 20 and the chain function as one. The circular plate 110 only rotates in order that the vibration energy absorbing apparatus (A1) absorb vibration energy by the rotation of the circulate plate. In contrast to the case in which an oil damper is used in operation, it is unnecessary to consider the stroke in operation and to maintain a stroke space. Accordingly, the vibration energy absorbing apparatus (A1) can be smaller and more efficient with respect to space than the apparatus in accordance with the prior art. Therefore, the vibration energy absorbing apparatus (A1) is more advantageous than the case of using the oil damper in accordance with the prior art because the displacement of the pushing point ($\delta d$) is larger by the principle of the lever.

Figure 34:
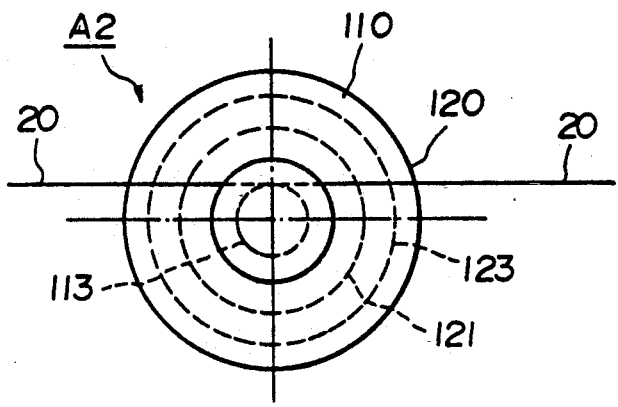
FIG. 34 is a plane view of the vibrational energy absorbing apparatus in the damping device of the construction, using fluid (A2).
Figure 35:
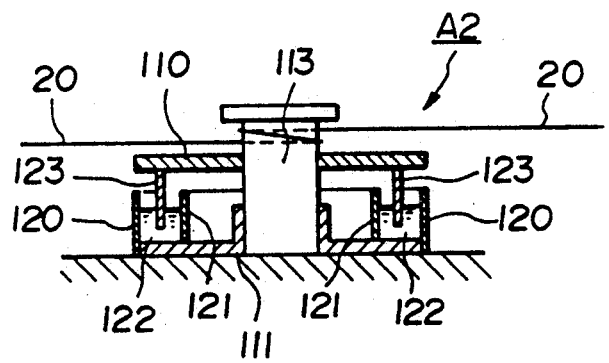
FIG. 35 is a vertical brooken side view of the vibrational energy absorbing apparatus in the damping device of the construction.

Next, a second example is explained with reference to FIGS. 34 and 35.

The vibration energy absorbing apparatus (A2) in accordance with the second example utilizes viscous resistance of the fluid (for example, a macromolecular material having butane-group) instead of the lead plug 112. That is, in the vibration energy absorbing apparatus (A2) in accordance with the second example, an outer barrel 120 and an inner barrel 121 were attached on the outer side of a top plate of the lower circular plate 111 fixed on the construction having the damping device. A ring-shaped part is formed between the outer barrel 20 and the inner barrel 121, and fluid 122 is in this ring-shaped part. A fin 132 is attached on the outer side of a bottom plate of the upper circular plate 110, and the lower part of the fin 133 is in this fluid 122.

In the vibration energy absorbing apparatus (A2) in accordance with the second example, the upper circular plate 110 rotates relative to the lower circular plate as the steel wire cable 20 is pulled to one side during the displacement of the construction having the damping device, in the same way as with the vibration energy absorbing apparatus (A1) in accordance with the first example. Then, shear resistance occurs in fluid 122, and the vibration energy is absorbed by the shear resistance. In the second example, in the same way as in first example, the damping force (the shear resistance of fluid 122) is amplified by the principle of the lever and is transferred to the damping device. The magnitude of this damping force depends on the viscosity and quantity of the fluid 122 and the regulation of the spaces between the outer barrel 20, the inner barrel 121, and the fin 123. The vibration energy absorbing apparatus (A2) in accordance with the second example permits the magnitude of stroke operation to be theoretically infinite.

Figure 36:
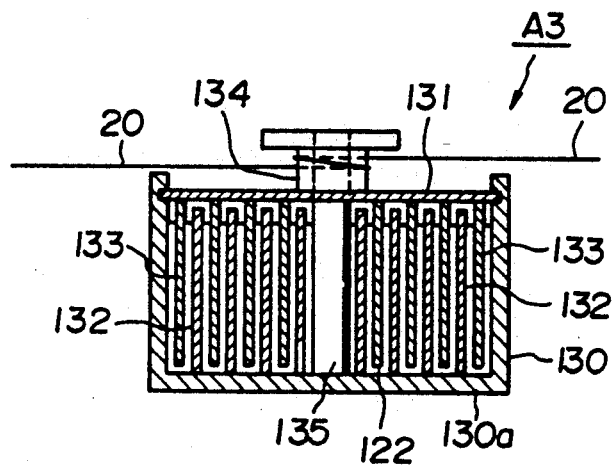
FIG. 36 is a vertical broken side view of the vibrational energy absorbing apparatus in the damping device of the construction, which is using (A3).

Next, the third example is explained with reference to FIGS. 36 to 38.

A vibration energy absorbing apparatus (A3) in accordance with the third example is constructed as follows. A dis 131 as the cap of a case 130 is provided rotatably on the case 130 which is pipe-shaped, for draining the fluid 122 which is the same as in the second example. Lower sleeves 132 are attached on the bottom face of the case 130; upper sleeves 133 are attached on the dis 131 (there are 4 lower sleeves 132 and 4 upper sleeves 133) in a corresponding manner. That is, in the vibration energy absorbing apparatus (A3) in accordance with the third example, the dis 31 corresponds to the upper circular plate 10 as in the first example and the second example; a case bottom (130a) of the case 130 corresponds to the lower circular plate 111 as in the first example and the second example; the fluid 122 is between the dis 131 and the case bottom (130a). Also in the third example, the steel wire cable 20 is wrapped around a short pipe body 134 of the dis 131 so as to not to slip.

The dis 131 rotates in order that the steel wire cable 20 be pulled according to the displacement of the constructions having the damping device, then the vibration energy is absorbed by the shear resistance force of the fluid 122. In this case also, the damping force is amplified by the principle of the lever; this phenomenon is similar to that in the first example and the second example. Furthermore, the damping force is adjusted by the number of the lower sleeve 132 and the upper sleeve 133, or by regulating the distances of each of the lower sleeve 132 and the upper sleeve 133. This matter is the same as in the second example.

Figure 37:
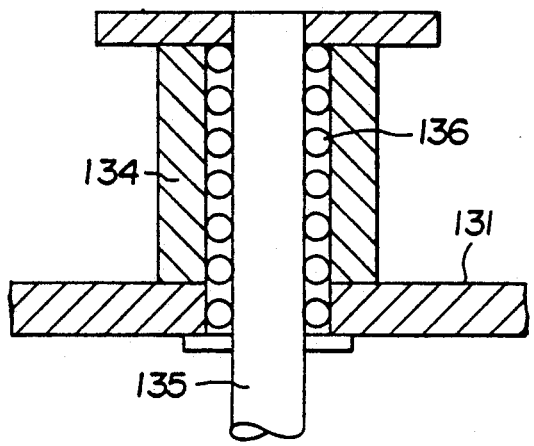
FIG. 37 is an enlarged vertical broken side view of the short pipe body of the vibrational energy absorbing apparatus in the damping device of the construction.
Figure 38:
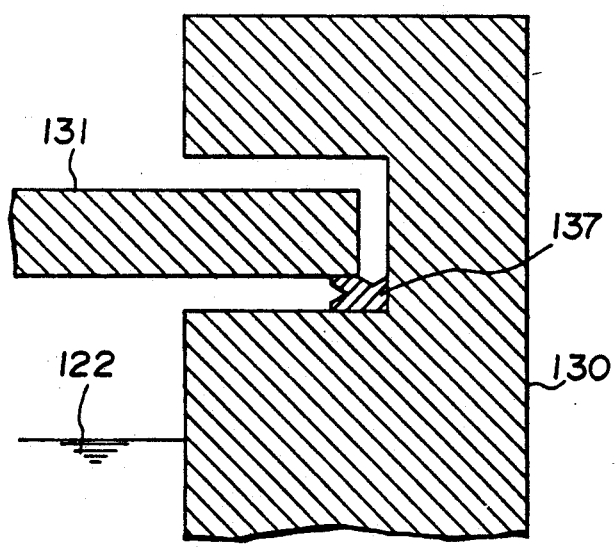
FIG. 38 is an enlarged vertical sectional side view of the seal material between the disc and the case of the vibrational energy absorbing apparatus in the damping device of the construction.
Figure 39:
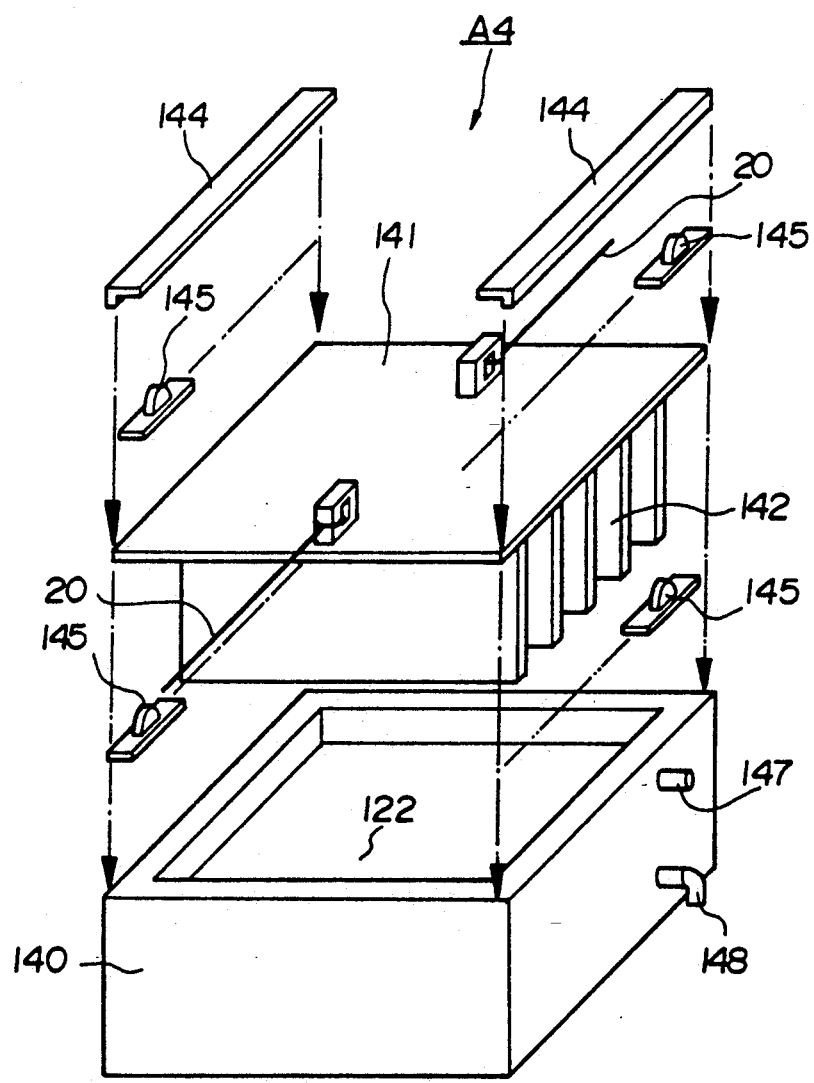
FIG. 39 is an perspective view of the vibrational energy absorbing apparatus in the damping device of the construction (A4).
Figure 40:
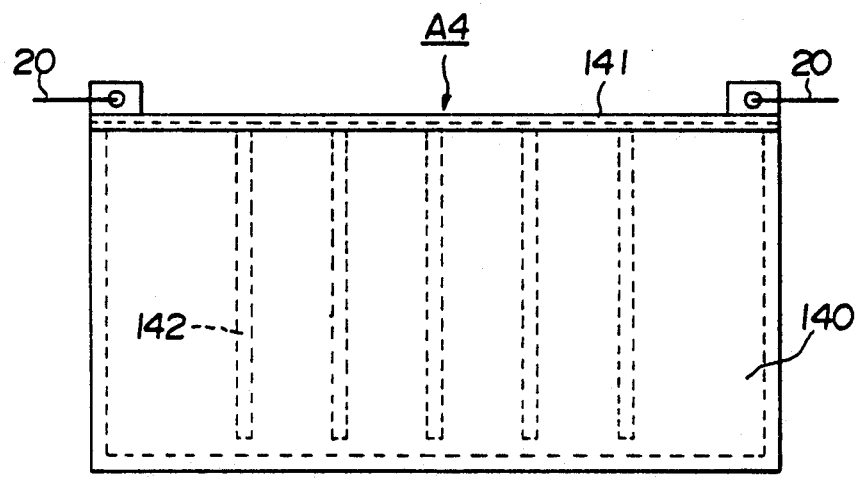
FIG. 40 is a side view of the vibrational energy absorbing apparatus in the damping device of the construction.

As shown in FIG. 37, the short pipe body 134 is hollow, an upper portion of a pivot 135 which is provided at the center position of the interior of the case 130 so as to be relatively rotatable, the upper portion is inserted through the inside of the short pipe body 134, and it is preferred that a bearing 136 be provided between the short pipe body 134 and the upper portion. As shown in FIG. 38, a seal material is provided between the case 130 and the edge of the circumference of the dis 131 so that the apparatus dose not leak.

The fourth example will be explained with reference to FIGS. 39 to 42.

Figure 41:
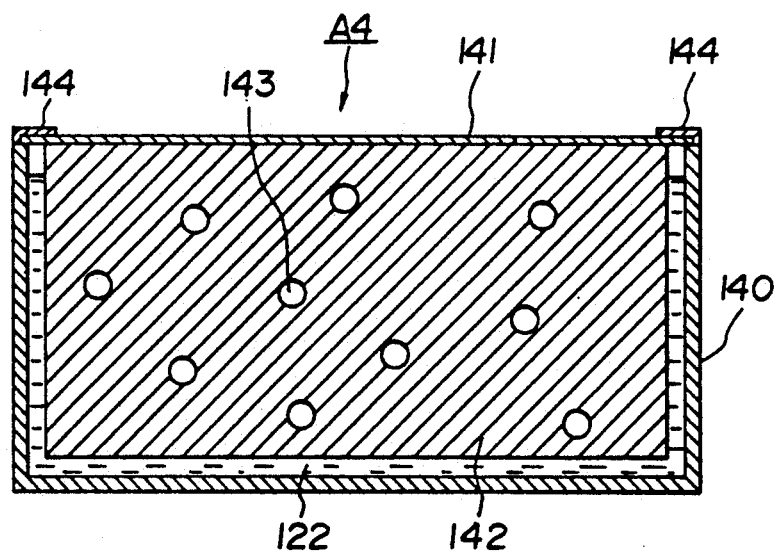
FIG. 41 is a vertical sectional view of the vibrational energy absorbing apparatus in the damping device of the construction.
Figure 42:
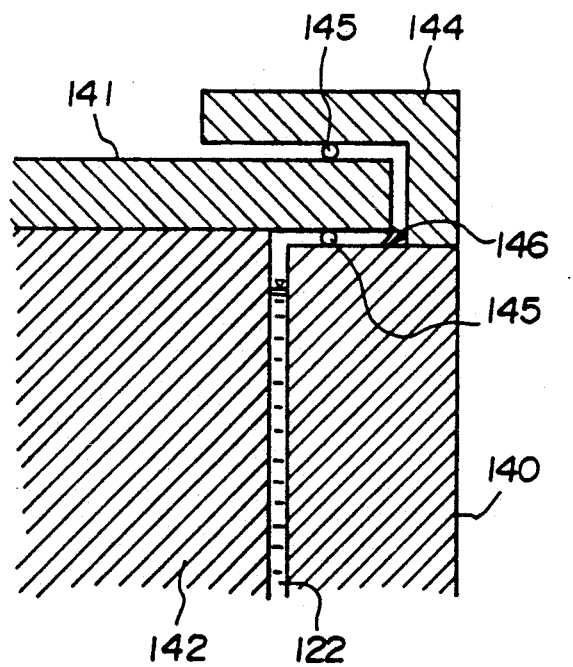
FIG. 42 is an enlarged vertical sectional view of the sealing of the vibrational energy absorbing apparatus in the damping device of the construction.

A vibration energy absorbing apparatus (A4) in accordance with the fourth example is constructed as follows. A rectangular plate body 141 corresponding to a cap of a casing 40 is attached on the rectangnlay cap which is for retaining fluid 122 so as to be able to move horizontally. The steel wire cable 20 is fixed at the upper face of the plate body 141. The plate body 141 displaces in the horizontal direction relative to the casing 141 when the steel wire cable 20 is pulled by the vibration of the construction having the damping device. Plural (5 in FIG. 39) damping boards 142 are provided on the bottom face of the plate body 141 so as to face in the direction of displacement of the plate body 141; the damping boards are immersed in the fluid 122 in the casing 140 when the plate body 141 is set on the casing 140. As shown in FIG. 41, holes 143 are formed in each damping board 142. The positions of the holes 143 are decided arbitrarily so that each hole 143 of adjacent the damping boards 142 are not in a line. Thereby, the viscous resistance of the fluid 122 can be sufficiently high when passing through the holes 143.

In FIGS. 39 to 42, an angled fixing material 144 restricts the direction of the moment of the plate board 141 so as to be able to be displaced only in the moving direction of the plate board 141 relative to the casing 140. A slider 145 is provided for displacing the plate body 141. A sealing 146 is provided between the casing 140 and the plate body 141. A center runner 147 for the fluid 122 is also provided. A scupper pipe 148 for the fluid 122 is also provided.

In the fourth example as explained with reference to FIGS. 39 to 42, the plate board 141 displaces relative to the casing 140 as the steel wire cable 20 is pulled with the vibration of the construction having the damping device. Then the damping board 142 displaces in the horizontal direction in the fluid 122. Accompanied by this, flow occurs in the fluid 122; the flow between the damping boards, furthermore, pass through the holes 143, then friction resistance producing vortexes and the like occur in the fluid 122, absorbing vibration energy.

In the vibration energy absorbing apparatus (A4) in accordance with the fourth example, since the damping force is absorbed by each of the pluralitg of damping boards 142, the damping force can be larger than the apparatus in accordance with the prior art and is exceedingly space efficient. Furthermore, it is possible to efficiently utilize the building frame of constructions having the damping device as the casing 40. In this case, cost is lower, and the exclusion term is shorter than the apparatus in accordance with the prior art. In particular, the vibration energy absorbing apparatus (A4) in accordance with the fourth example is adopted as a vibration energy absorbing apparatus in the damping device, for example, in constructions having a damping device.

In this fourth example, it is possible that the damping force is controlled not only in accordance with the viscosity and quantity of the fluid 122 in the casing 140, but also in accordance with the area or number the damping boards 142 and the number or area of the holes 143.

Each vibration energy absorbing apparatus (A1, A2, A3, and A4) in accordance with the first to fourth examples is able to be adapted to any of the constructions having the damping device (C1, C2, and C3) in accordance with the first to third embodiments.

The dashpot and the like are preferable as the damper used in other vibration energy absorbing apparatuses.

Damping Simulations

Finally, simulations of the damping of vibrations in a construction having a damping device of the present invention is explained. Three types of models were used in this simulation.

Experimental model

The construction in accordance with the prior art (ORI 100), the construction having the damping device using dashpot (DSP 100), and the construction having the damping device using a laminated rubber damper having lead plugs (LRB 080) were adopted as simulation models.

1. Model ORI 100

Model ORI 100 is a steel frame construction simulation having 28 floors (height approximately 110 m, weight approximately 40,000 t, damping ratio 2%, and primary natural period 3 seconds).

2. Model LRB 080

Model LRB 080 is a construction simulation having a damping device which has cables and laminated rubber dampers.

Each wire is tautly and obliquely provided from the 22nd floor, 15th floor or 8th floor to the ground, and from the top floor to the 8th floor.

Each laminated rubber damper is provided at the middle portion of each steel wire cable. The laminated rubber having lead plugs absorbs vibrational energy by the fundamental hysteresis absorbing accompanied with plastic deformation. The damping capacity of the laminated rubber damper having lead plugs approximately corresponds in cross-sectional area to that of the lead plugs. In LRB 080, as maximum displacement of the laminated rubber damper is 13.5 cm, plastic strength of the laminated rubber damper is 124 t (in the plastic zone, that is, only the displacement increases without an increase of the horizontal force). The characteristic of the damping is the same as the laminated rubber damper 30 in the embodiment 1.

Horizontal rigidity of building frames in accordance with LRB 080 is 80% of horizontal rigidity in accordance with ORI 100, with consideration effective for horizontal rigidity by the steel wire cables which are tautly provided on the building.

The size of the building and the like in accordance with LRB 080 are the same as the size of the building and the like in accordance with ORI 100.

Each wire comprises four wires 10 cm in diameter. As the laminated rubber damper experiences 150 t in plastic strength, a quarter of the 150 t is absorbed to elastic deformation of the steel wire cables.

3. Model DSP 100

Model DSP 100 is a construction simulation having a damping device which has cables and oil dampers.

Each wire is tautly and obliquely provided from the 22nd floor, 15th floor, or 8th floor to the ground, and from the top floor to the 8th floor.

Each oil damper is provided at the middle portion of each steel wire cable. The oil damper has a capacity which is the same as the capacity of the laminated rubber damper.

The size and horizontal strength of the building, the steel wire cable and like, in accordance with DSP 100, are the same as the size and horizontal strength of the building, the steel wire cable and the like in accordance with LRB 080.

Figure 18:
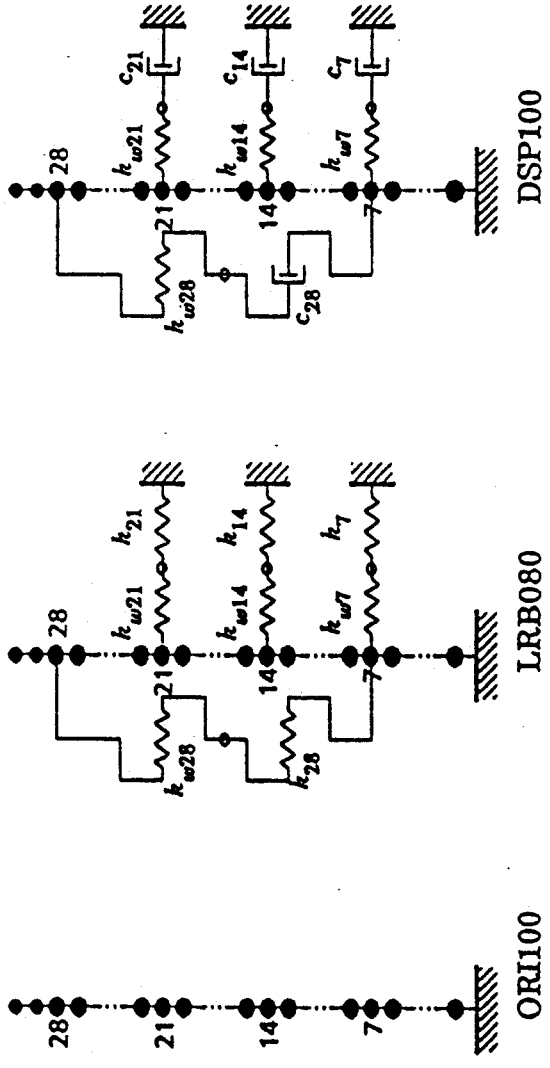
FIG. 18(A) shows a simulation model of the ORI100.
FIG. 18(B) is analyzing model of the LRB080.
FIG. 18(C) is analyzing model of the DSP100.

The model analysis of ORI 100 is indicated in FIG. 18(A), the model analysis of the LRB 080 is indicated in FIG. 18(B), and the model analysis of the DSP 100 is indicated in FIG. 18(C).

Results of the Experiment

Models ORI 100, LRB 080, and DSP 100 as above were analyzed in simulations using artificial earthquake waves which have appropriate frequency characteristics for these designs. The results are indicated below.

Figure 19:
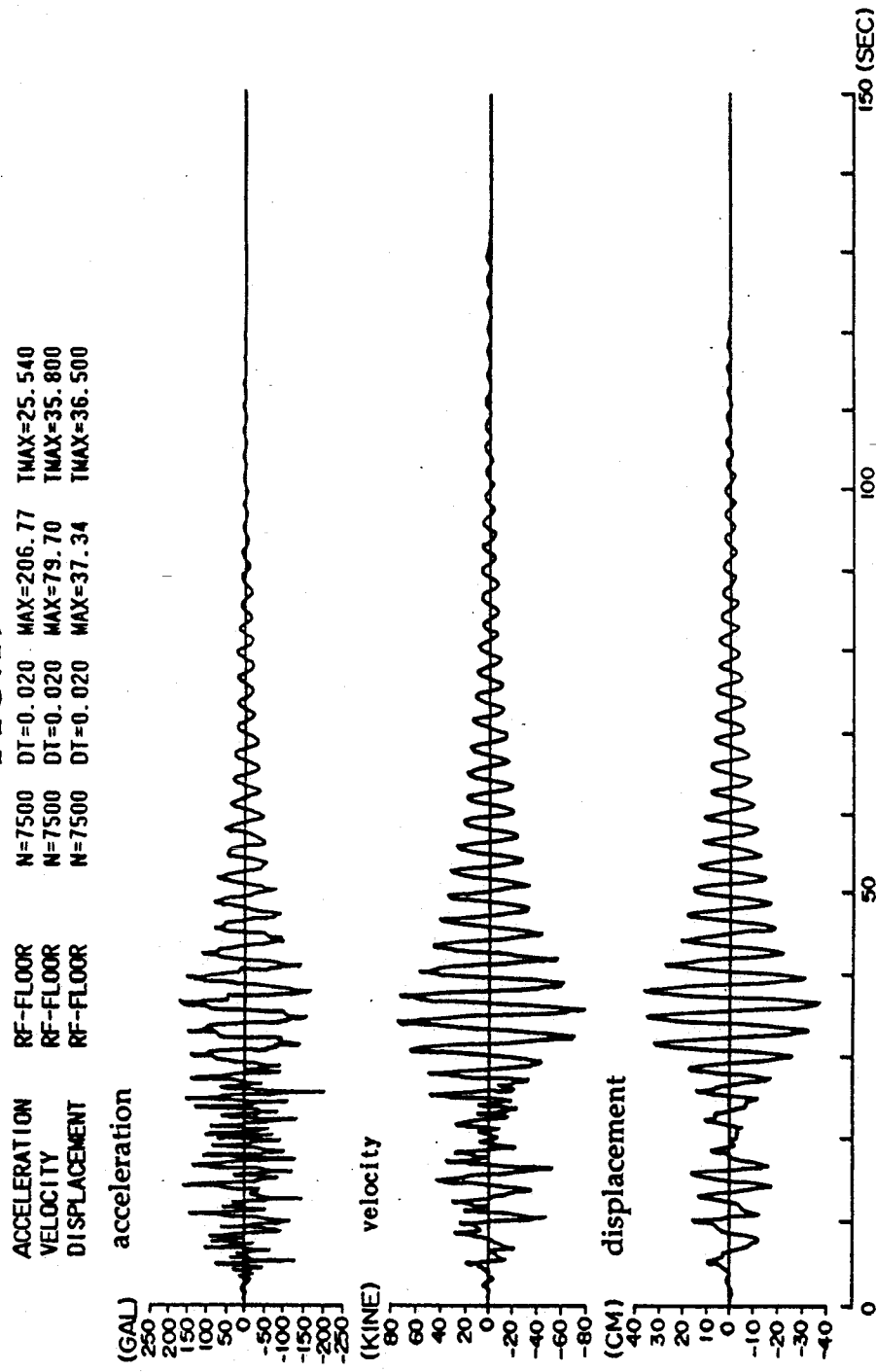
FIG. 19 is a graph of the earthquake response wave form of the ORI100.
Figure 20:
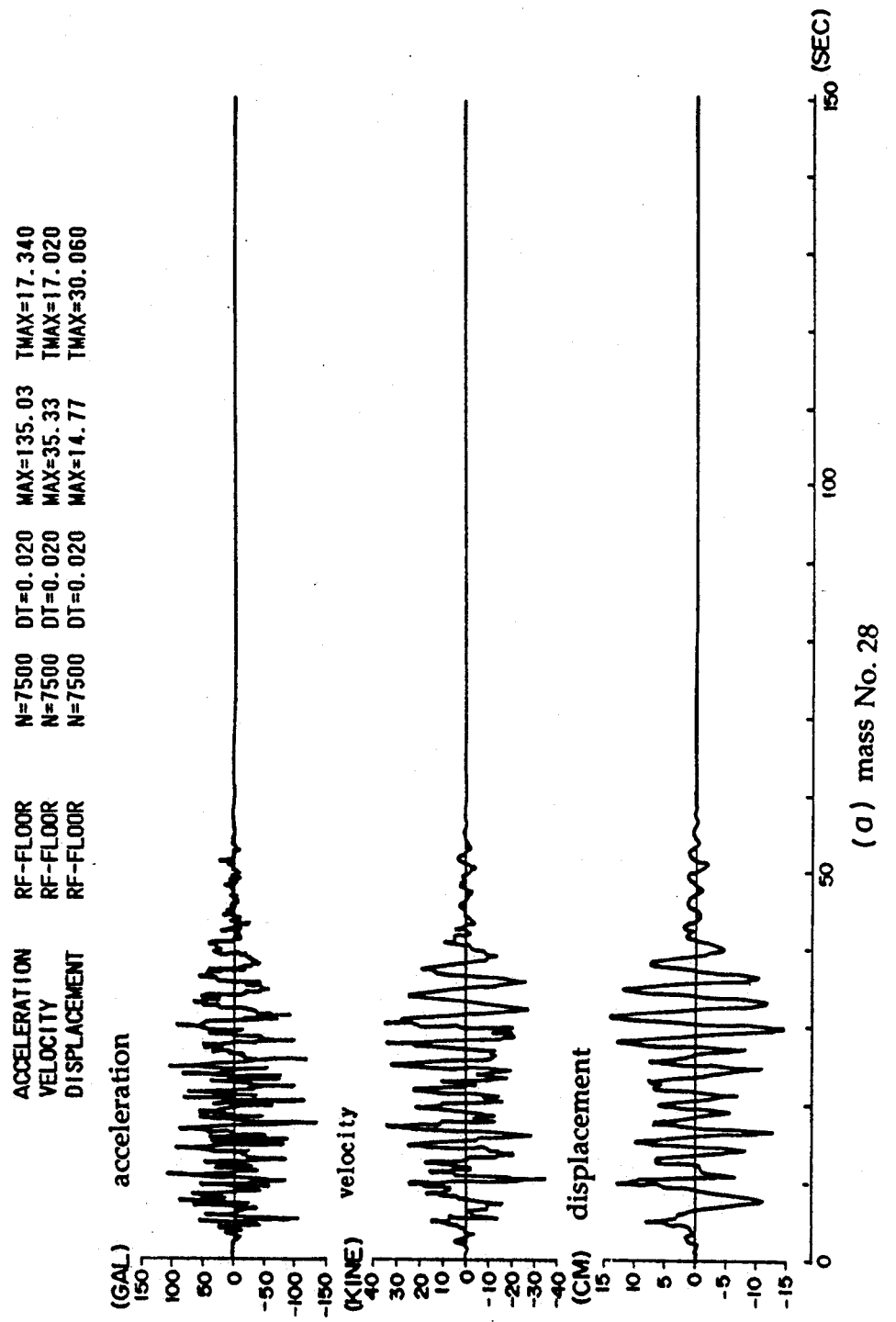
FIG. 20 is a graph of the earthquake response wave form of the DSP100.
Figure 21:
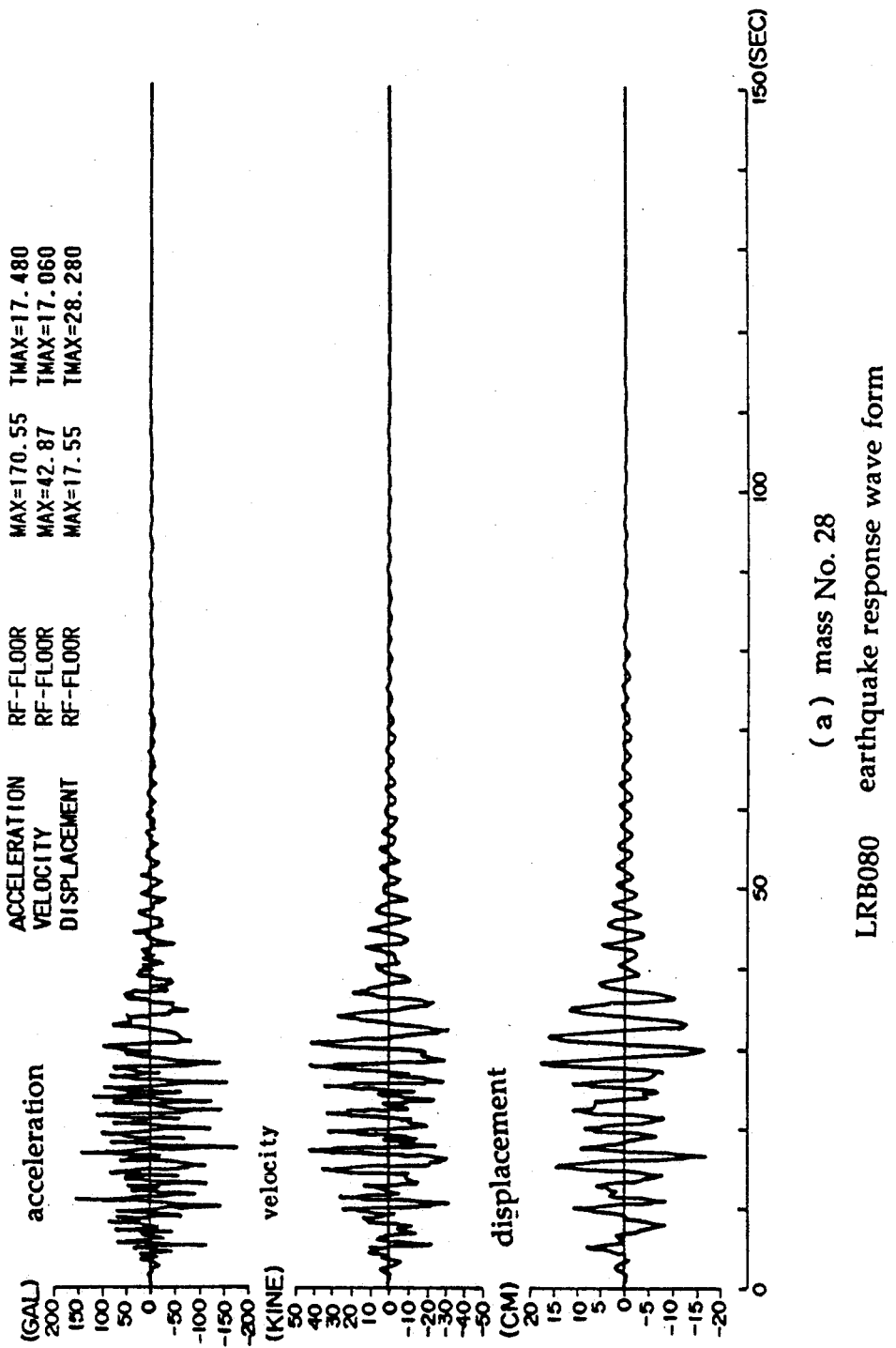
FIG. 21 is a graph of the earthquake response wave form of the LRB080.
Figure 22:
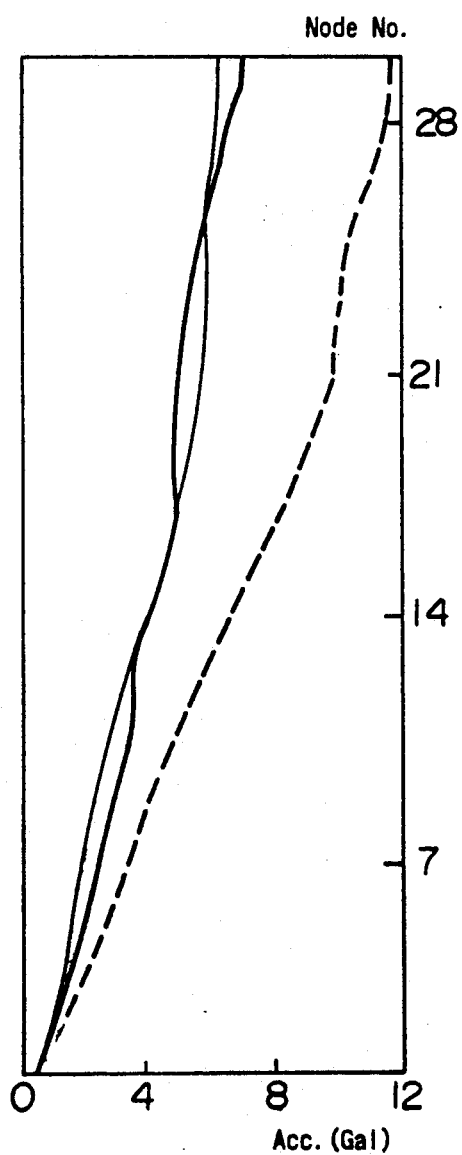
FIG. 22 is a graph of the maximum response acceleration by an earthquake.
Figure 23:
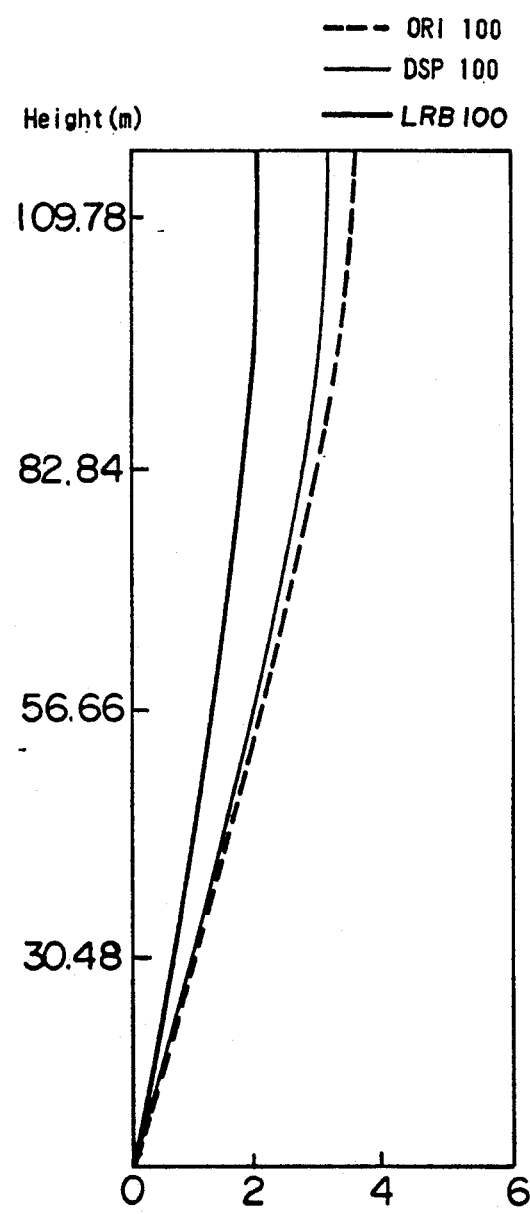
FIG. 23 is a graph of the maximum response displacement by an earthquake.

An example of a graph of earthquake response wave forms of the ORI 100 is indicated in FIG. 19, an example of a graph of the earthquake response wave form of the DSP 100 is indicated in FIG. 20, and an example of a graph in earthquake response wave form of the LRB 080 is indicated in FIG. 21.

As shown in FIGS. 19 to 21, vibration of the constructions was gradually damped after earthquake movement in ORI 100; however, the vibration was completely damped after 100 seconds. As compared with this, vibration was damped rapidly after earthquake movement in DSP 100 and LRB 080. Maximum response acceleration and maximum response displacement of DSP 100 and LRB 080 were less than half of ORI 100.

Figure 24:
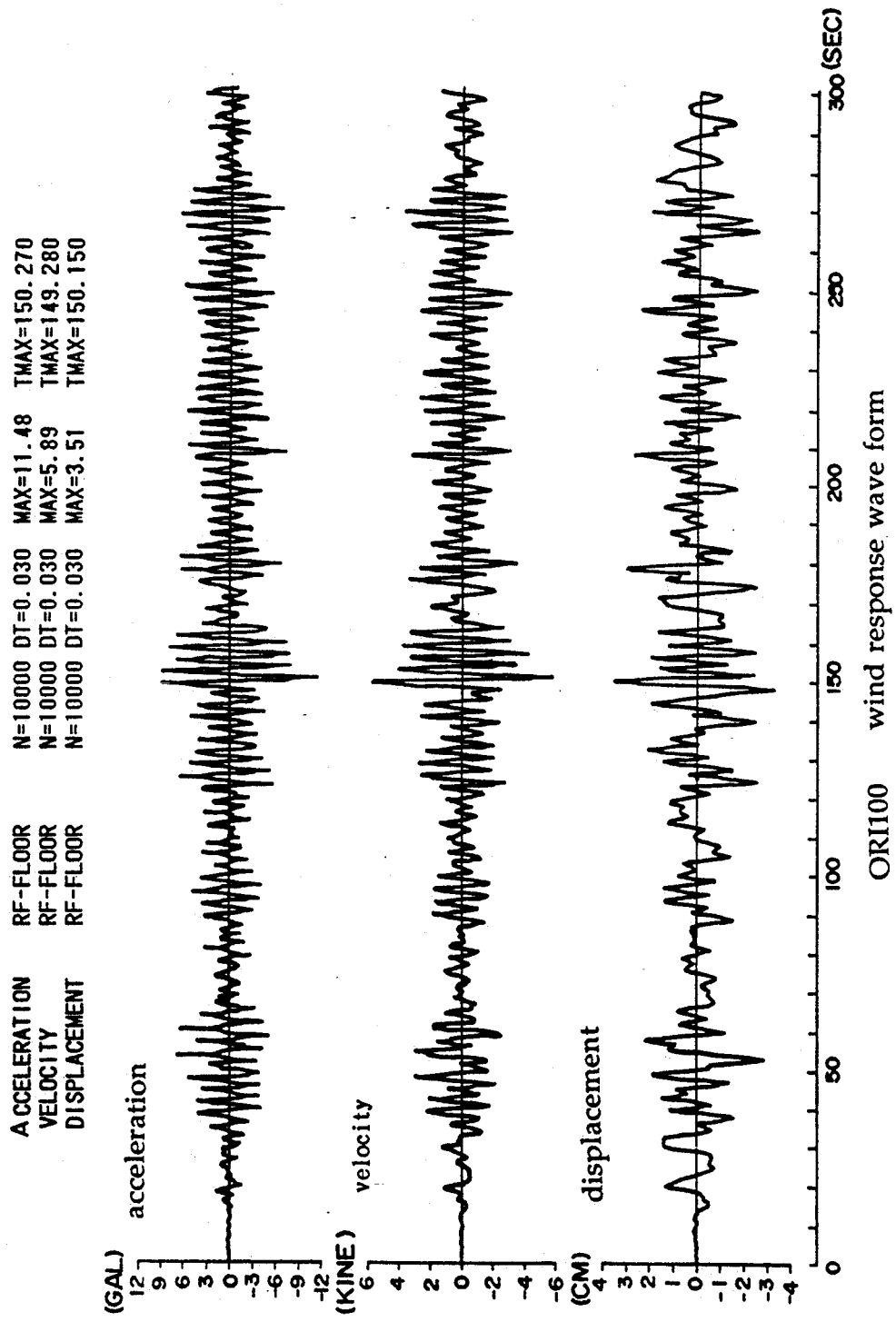
FIG. 24 is a graph of the wind response wave form of the ORI100.
Figure 25:
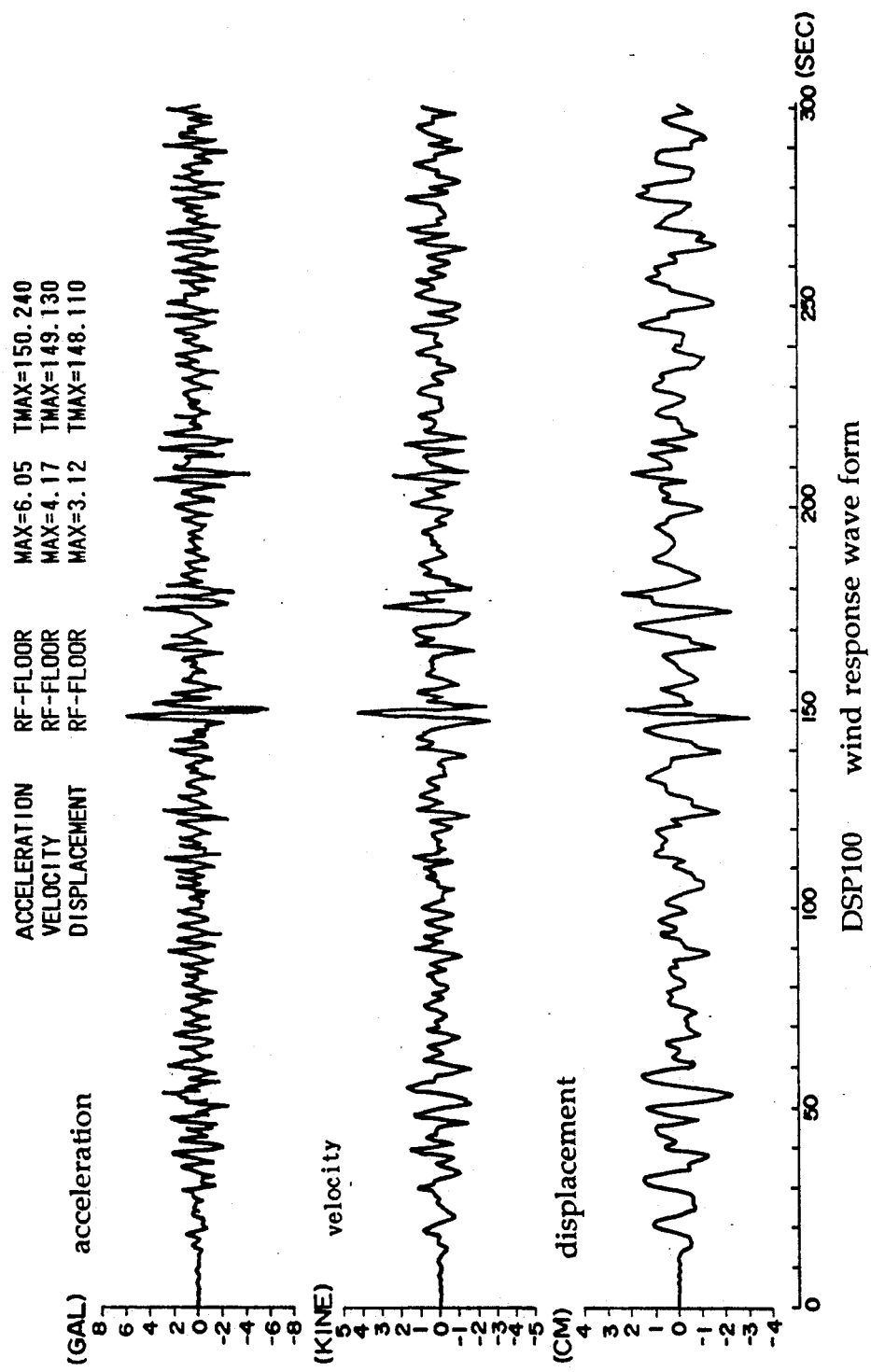
FIG. 25 is a graph of the wind response wave form of the DSP100.
Figure 26:
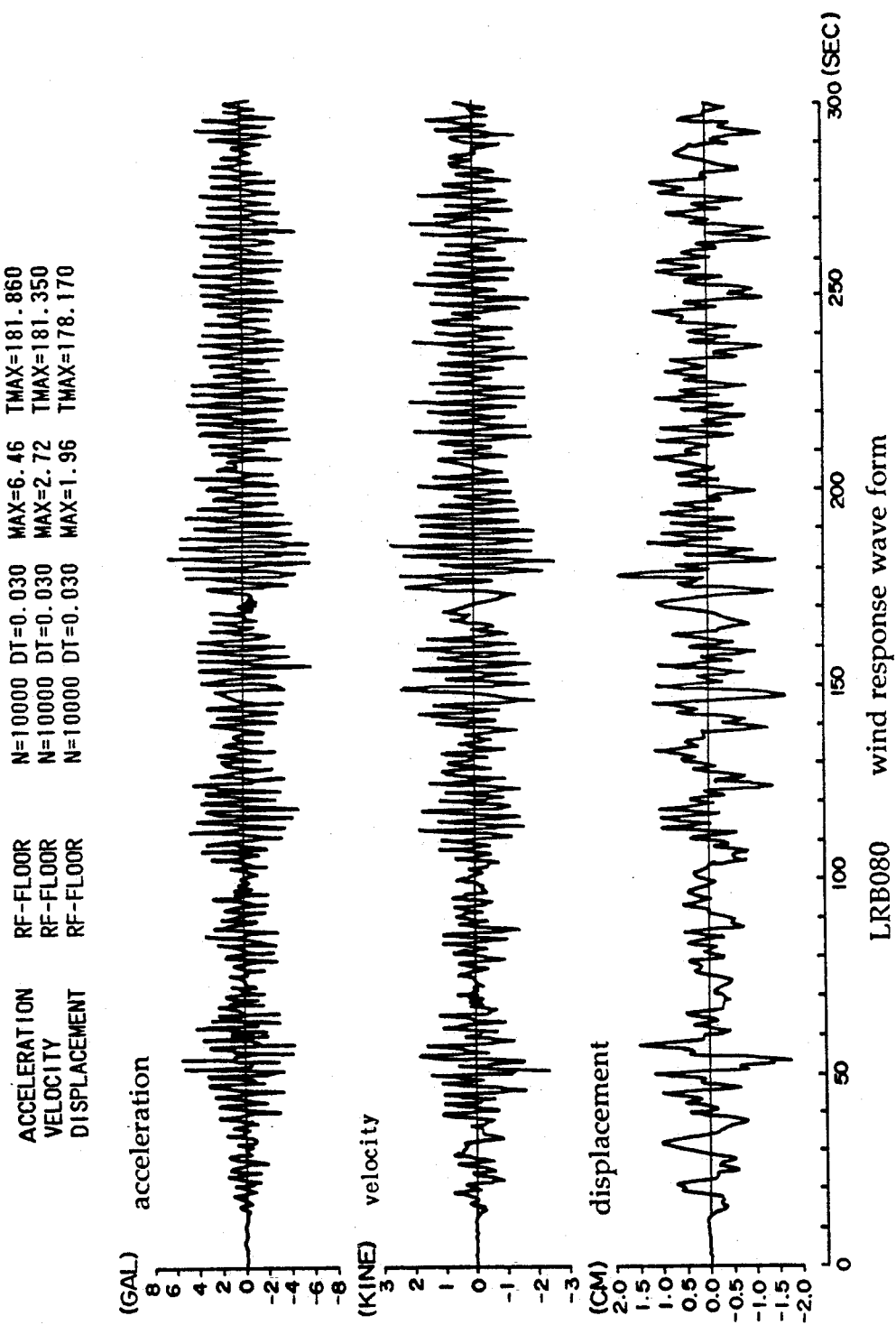
FIG. 26 is a graph of the wind response wave form of the LRB080.

The response characteristics to wind were then determined for comparison. Acceleration, velocity and response displacement wave forms which are perpendicular to wind in the ORI 100, DSP 100, and LRB 080 are indicated in FIGS. 24 to 26, respectively. As shown in FIGS. 24 to 26, the response wave forms of the constructions of DSP 100 and LRB 080 are compared with ORI 100. The amplitude of the response wave forms of the constructions of the DSP 100 and LRB 080 is smaller than the amplitude of the response wave form of the constructions of the ORI 100. Accordingly, it is possible to say that the damping effect of the DSP 100 and LRB 080 is obvious.

Figure 27:
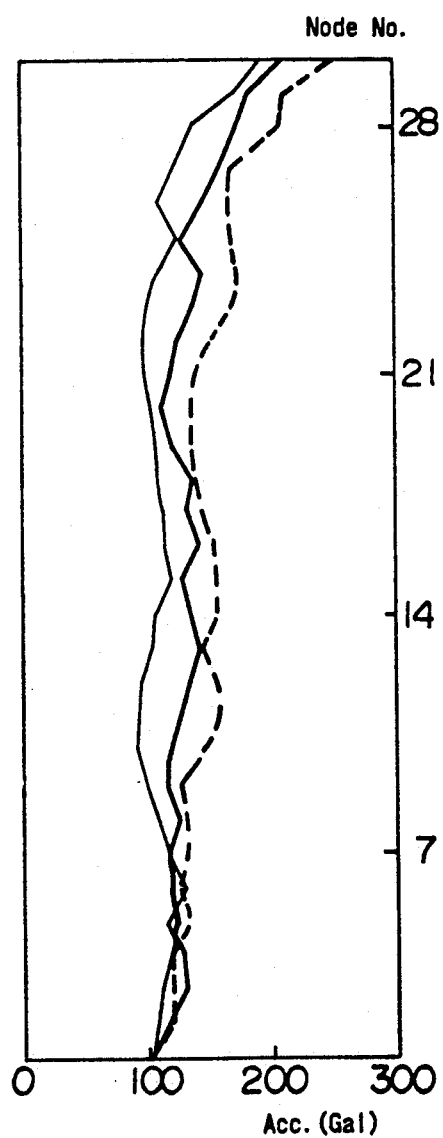
FIG. 27 is a graph of the maximum response acceleration by wind.
Figure 28:
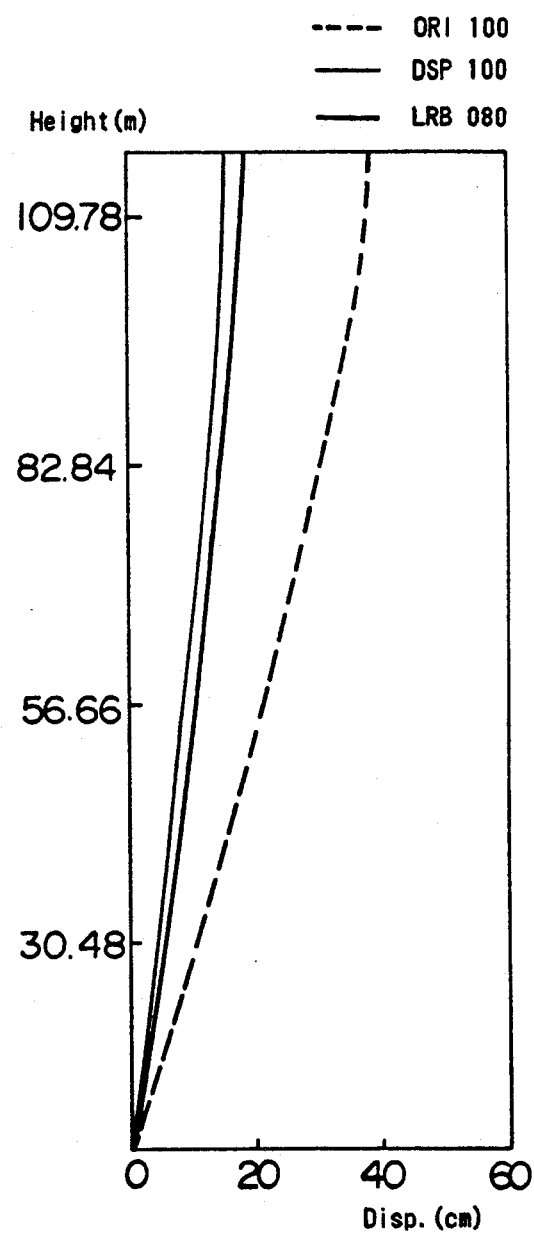
FIG. 28 is a graph of the maximum response displacement by wind.
Figure 29:
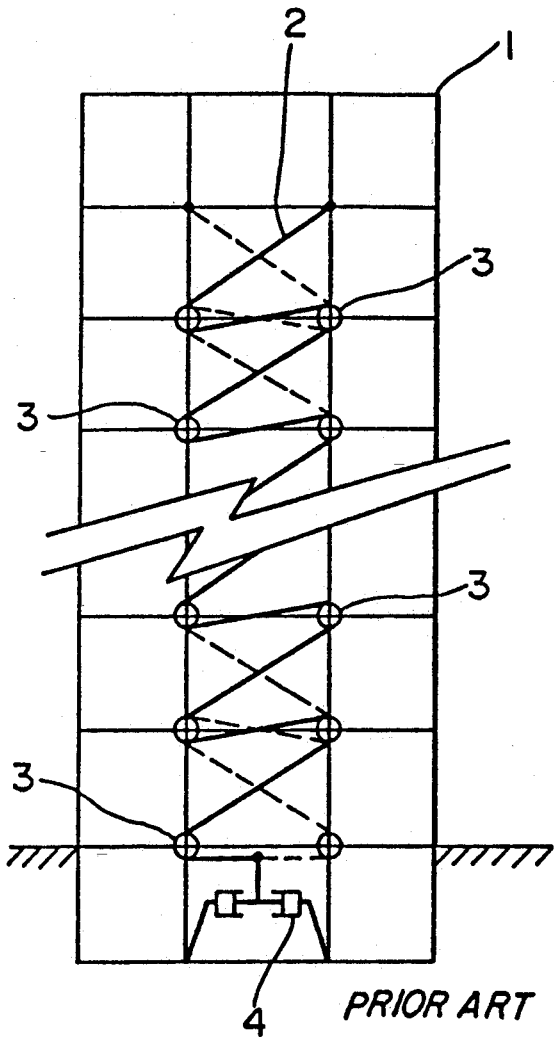
FIG. 29 is a construction having the damping device in accordance with the prior art.
Figure 30:
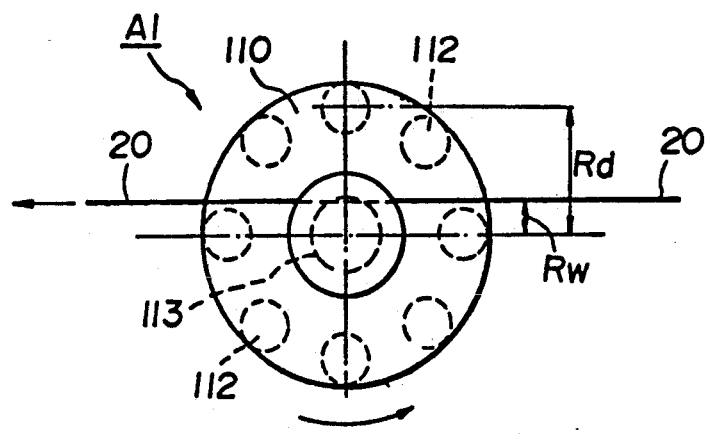
FIG. 30 is a plane view of the vibrational energy absorbing apparatus in the damping device of the construction, using lead plugs (A1).
Figure 31:
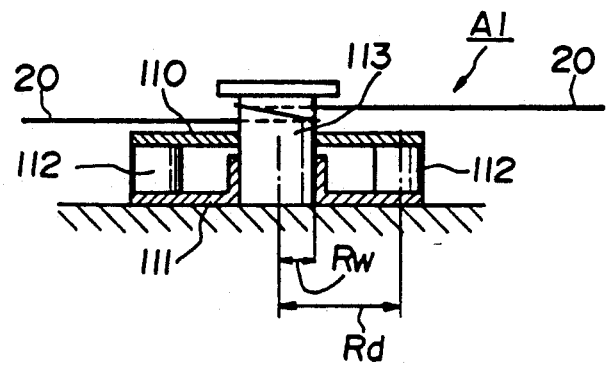
FIG. 31 is a vertical broken side view of the vibrational energy absorbing apparatus in the damping device of the construction.
Figure 32:
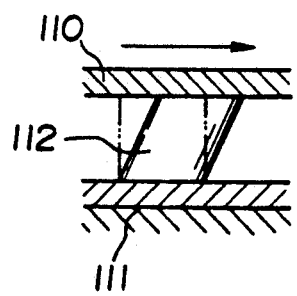
FIG. 32 is a enlarged vertical broken side view of the vibrational energy absorbing apparatus in the damping device of the construction.

The vertical distribution of maximum response acceleration and maximum response displacement of the constructions of the ORI 100, DSP 100 and LRB 080 are indicated in FIGS. 27 and 28. As shown in FIGS. 27 and 28, Acceleration response value of the top of the constructions of ORI 100 is about 12 Gal, however, the acceleration response value of the top of the constructions of DSP100 and LRB080 are decreased to about 6 to 7 Gal.

Other preferable damping apparatus (A1, A2, A3, A4 and the like) were adopted as experiment models. For instance, when the vibration energy absorbing apparatus (A2) is adopted, the diameter and the height of the vibration energy absorbing apparatus (A1), which can be calculated from equations, are about 1.3 m and 0.5 m, so that damping force is 124 t (maximum velocity: 31 cm/second). Another preferable damping apparatus (A1, A3, A4 and the like) having damping effects which are similar to the damping effect of the laminated rubber damper produce experimental results experiment which are similar to the above.

What is claimed is:

1. A construction having a damping device for damping vibrations therein comprising:
   a building;
   the damping device including at least one wire cable wherein both ends of each thereof are fixed to opposite sides of the building, each wire cable tautly and obliquely provided on the building so that one side and the other side of each wire cable cross at only one point; and
   at least one damping means for absorbing vibrational energy, the damping means fixed on the building and connected at approximately the middle portion of each wire cable at the base of the building;
   wherein each of said one side and the other side of each wire cable is connected with said damping means for absorbing vibrational energy through at least one pulley.

2. A construction having a damping device in accordance with claim 1, wherein the damping means comprises: two circular plates rotatably allocated in opposition, one of which is fixed on the building, and the other of which having an axis body having a unslipable wire cable wrapped around the axis body so as to transform the displacement of the building to rotational energy; and
   damping materials for absorbing vibrational energy by deformation provided between the two circular plates.

3. A construction having a damping device in accordance with claim 2, wherein the diameter of the axis body is smaller than the distance between the center of the circular plates to the position at which the damping materials are provided.

4. A construction having a damping device in accordance with claim 2, wherein the damping material is lead plugs.

5. A construction having a damping device in accordance with claim 2, wherein the damping material is laminated gums.

6. A construction having a damping device in accordance with claim 2, wherein the damping material is a fluid, a housing for maintaining the fluid is provided at one circular plate, and at least one fin for producing fluid friction is provided at the other plate.

7. A construction having a damping device in accordance with claim 1, wherein the damping means comprises:
- a casing fixed on the building;
- a fluid retained in the casing; and
- a plate body acting as movable lid on the casing;
- wherein the at least one wire cable is fixed to the plate body to transform displacement of the building into tension in the wire cable; and
- wherein at least one damping board is provided on the bottom of the plate body so that the at least one damping board is immersed in the fluid.

8. A construction having a damping device in accordance with claim 7, wherein at least one hole is provided on at least one dampening board.

9. A construction having a damping device in accordance with claim 7, wherein the fluid is a macromolecular material having butane group.

10. A construction having a damping device for damping vibrations therein comprising:
- a building;
- the damping device including at least one group of wire cables wherein the both ends of each wire cable are fixed to opposite sides of the building, each group of wire cables is tautly and obliquely provided on the building so that one side and the other side of each wire cable cross at only one point, each wire cable disposed so as to be parallel to the other; and
- at least one damping means for absorbing vibrational energy, the damping means fixed on the building and connected at approximately the middle portion of each wire cable at the base of the building;
- wherein each of said one side and the other side of the wire cable is connected with the damping means for absorbing vibrational energy through at least one pulley.

11. A construction having a damping device in accordance with claim 10, wherein the damping means comprises: two circular plates rotatably allocated in opposition, one of which is fixed on the building, and the other of which having an axis body having a unslipable wire cable wrapped around the axis body so as to transform the displacement of the building to rotational energy; and
- damping materials for absorbing vibrational energy by deformation provided between the two circular plates.

12. A construction having a damping device in accordance with claim 11, wherein the diameter of the axis body is smaller than the distance between the center of the circular plates and the position at which the damping materials are provided.

13. A construction having a damping device in accordance with claim 11, wherein the damping material is lead plugs.

14. A construction having a damping device in accordance with claim 11, wherein the damping material is laminated gums.

15. A construction having a damping device in accordance with claim 11, wherein the damping material is a fluid, a housing for maintaining the fluid is provided at one circular plate, and at least one fin for producing fluid friction is provided at the other plate.

16. A construction having a damping device in accordance with claim 10, wherein the damping means comprises:
- a casing fixed on the building;
- a fluid retained in the casing; and
- a plate body acting as movable lid on the casing;
- wherein the at least one wire cable is fixed to the plate body to transform displacement of the building into tension in the wire cable; and
- wherein at least one damping board is provided on the bottom of the plate body so that the at least one damping board is immersed in the fluid.

17. A construction having a damping device in accordance with claim 16, wherein at least one hole is provided on the at least one damping board.

18. A construction having a damping device in accordance with claim 16, wherein the fluid is a macromolecular material having butane group.

19. A construction having a damping device for damping vibrations therein comprising:
- a building having a central space;
- the damping device including at least one wire cable wherein both ends of each wire cable are fixed on the building in the central space, each wire cable tautly and obliquely provided on the building so that one side and the other side of each wire cable cross at only one point; and
- at least one damping means for absorbing vibrational energy, fixed on the building and connected at approximately the middle portion of each wire cable at the base of the building;
- wherein each of said side and the other side of each wire cable is connected with said damping means for absorbing vibrational energy through at least one pulley.

20. A construction having a damping device in accordance with claim 19, wherein the damping means comprises: two circular plates rotatably allocated in opposition, one of which is fixed on the building, and the other of which having an axis body having a unslipable wire cable wrapped around the axis body so as to transform the displacement of the building to rotational energy; and
- damping materials for absorbing vibrational energy by deformation provided between the two circular plates.

21. A construction having a damping device in accordance with claim 20, wherein the diameter of the axis body is smaller than the distance between the center of the circular plates and the position at which the damping materials are provided.

22. A construction having a damping device in accordance with claim 20, wherein the damping material is lead plugs.

23. A construction having a damping device in accordance with claim 20, wherein the damping material is laminated gums.

24. A construction having a damping device in accordance with claim 20, wherein the damping material is a fluid, a housing for maintaining the fluid is provided at one circular plate, and at least one fin for producing fluid friction is provided at the other plate.

25. A construction having a damping device in accordance with claim 19, wherein the damping means comprises:
a casing fixed on the building;
a fluid retained in the casing; and
a plate body acting as a movable lid on the casing;
wherein the at least one wire cable is fixed to the plate body to transform displacement of the building into tension in the wire cable; and
wherein at least one damping board is provided on the bottom of the plate body so that the at least one damping board is immersed in the fluid.

26. A construction having a damping device in accordance with claim 25, wherein at least one hole is provided on the at least one damping board.

27. A construction having a damping device in accordance with claim 25, wherein the fluid is a macromolecular material having butane group.

28. A construction having a damping device in accordance with claim 19, wherein the damping means comprises:
a casing fixed on the building;
a fluid retained in the casing; and
a plate body acting as a movable lid on the casing;
wherein at least one wire cable is fixed to the plate body to transform displacement of the building into tension in the wire cable; and
wherein at least one damping board is provided on the bottom of the plate body so that the at least one damping board is immersed in the fluid.

29. A construction having a damping device in accordance with claim 28, wherein at least one hole is provided on the at least one damping board.

30. A construction having a damping device in accordance with claim 28, wherein the fluid is a macromolecular material having butane group.

31. A construction having a damping device for damping vibrations therein comprising:
a building frame having a central space;
the damping device including at least one group of wire cables wherein the both ends of each wire cables are fixed on the building so as to be in the central space, each group of wire cables tautly and obliquely provided on the building so that one side and the other side of each wire cable cross at only one point, each wire cable disposed so as to be parallel to the other; and
at least one damping means for absorbing vibrational energy, each damping means fixed on the building and connected at approximately the middle portion of each wire cable on the base of the building;
wherein each of said one side and the other side of the wire cable is connected with the damping means for absorbing vibrational energy through at least one pulley.

32. A construction having a damping device in accordance with claim 31, wherein the damping means comprises: two circular plates rotatably allocated in opposition, one of which is fixed on the building, and the other of which having an axis body having a unslipable wire cable wrapped around the axis body so as to transform the displacement of the building to rotational energy; and
damping materials for absorbing vibrational energy by deformation provided between the two circular plates.

33. A construction having a damping device in accordance with claim 32, wherein the diameter of the axis body is smaller than the distance between the center of the circular plates and the position at which the damping materials are provided.

34. A construction having a damping device in accordance with claim 32, wherein the damping material is lead plugs.

35. A construction having a damping device in accordance with claim 32, wherein the damping material is laminated gums.

36. A construction having a damping device in accordance with claim 32, wherein the damping material is a fluid, a housing for maintaining the fluid is provided at one circular plate, and at least one fin for producing fluid friction is provided at the other plate.

* * * * *